(12) United States Patent
Tripathi et al.

(10) Patent No.: US 11,871,184 B2
(45) Date of Patent: Jan. 9, 2024

(54) HEARING IMPROVEMENT SYSTEM

(71) Applicants: Pradeep Ram Tripathi, Miami Beach, FL (US); Robert W. Connors, Lake Barrington, IL (US); Nishant Ram Tripathi, Miami Beach, FL (US)

(72) Inventors: Pradeep Ram Tripathi, Miami Beach, FL (US); Robert W. Connors, Lake Barrington, IL (US); Nishant Ram Tripathi, Miami Beach, FL (US)

(73) Assignee: Ramtrip Ventures, LLC, Miami, FL (US)

( * ) Notice: Subject to any disclaimer, the term of this patent is extended or adjusted under 35 U.S.C. 154(b) by 306 days.

(21) Appl. No.: 17/142,885

(22) Filed: Jan. 6, 2021

(65) Prior Publication Data
US 2021/0211814 A1 Jul. 8, 2021

Related U.S. Application Data

(60) Provisional application No. 62/958,085, filed on Jan. 7, 2020.

(51) Int. Cl.
| | |
|---|---|
| H04R 25/00 | (2006.01) |
| G06F 3/0482 | (2013.01) |
| G10L 21/0272 | (2013.01) |
| G06F 3/04817 | (2022.01) |
| G10L 25/51 | (2013.01) |
| H04W 88/02 | (2009.01) |

(52) U.S. Cl.
CPC ......... *H04R 25/558* (2013.01); *G06F 3/0482* (2013.01); *G06F 3/04817* (2013.01); *G10L 21/0272* (2013.01); *G10L 25/51* (2013.01); *H04R 25/505* (2013.01); *H04R 25/554* (2013.01); *H04R 2225/39* (2013.01); *H04R 2225/41* (2013.01); *H04R 2225/55* (2013.01); *H04R 2225/61* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 10,754,611 B2 * | 8/2020 | Agrawal | G06F 3/167 |
| 2002/0000879 A1 | 1/2002 | Brown, Sr. | |
| 2002/0068552 A1 | 6/2002 | Siemens | |
| 2002/0150254 A1 | 10/2002 | Wilcock et al. | |

(Continued)

*Primary Examiner* — Hemant S Patel
(74) *Attorney, Agent, or Firm* — K&L Gates LLP

(57) ABSTRACT

A hearing improvement system for use with a user's smart device and earpiece/headphones includes software stored on a memory device of the smart device, the software configured to be executed by a processor of the smart device to cause an audio signal received from a microphone of or operating with the smart device if containing two or more sound patterns to be separated into a plurality of individualized sound patterns; categorize the individualized sound patterns; display an icon representing each categorized sound pattern on a screen of the smart device; enable a user viewing the icons to at least one of deactivate or activate each of the individualized sound patterns; and enable each of the non-deactivated individualized sound patterns to be delivered to the user's earpiece/headphones.

24 Claims, 14 Drawing Sheets

(56) References Cited

U.S. PATENT DOCUMENTS

| | | | |
|---|---|---|---|
| 2003/0022703 A1* | 1/2003 | Reshefsky | H04M 1/6058 455/569.2 |
| 2003/0063133 A1* | 4/2003 | Foote | G06F 16/29 715/850 |
| 2003/0195978 A1 | 10/2003 | Fellenstein et al. | |
| 2004/0109570 A1 | 6/2004 | Bharitkar et al. | |
| 2004/0203695 A1* | 10/2004 | Mikan | H04M 3/42382 455/418 |
| 2005/0018502 A1 | 1/2005 | Morishima et al. | |
| 2005/0191959 A1 | 9/2005 | Horoschak et al. | |
| 2006/0009060 A1 | 1/2006 | Chen et al. | |
| 2007/0127731 A1 | 6/2007 | Aarts et al. | |
| 2007/0165838 A1 | 7/2007 | Li et al. | |
| 2007/0291693 A1 | 12/2007 | Schultz et al. | |
| 2011/0158133 A1 | 6/2011 | Boland | |
| 2011/0261150 A1 | 10/2011 | Goyal et al. | |
| 2011/0305343 A1 | 12/2011 | Lee et al. | |
| 2012/0215519 A1 | 8/2012 | Park et al. | |
| 2013/0156220 A1 | 6/2013 | Bar-Zeev et al. | |
| 2013/0243213 A1 | 9/2013 | Moquin | |
| 2013/0338806 A1 | 12/2013 | LaRosa et al. | |
| 2015/0030149 A1 | 1/2015 | Chu et al. | |
| 2015/0117649 A1 | 4/2015 | Nesta et al. | |
| 2015/0117657 A1 | 4/2015 | Anazawa | |
| 2015/0146878 A1 | 5/2015 | Meredith et al. | |
| 2016/0014497 A1 | 1/2016 | Chizi et al. | |
| 2016/0041807 A1 | 2/2016 | LaRosa et al. | |
| 2016/0088388 A1 | 3/2016 | Franck et al. | |
| 2016/0210972 A1 | 7/2016 | Nurmukhanov et al. | |
| 2016/0275933 A1 | 9/2016 | Meredith et al. | |
| 2017/0251301 A1 | 8/2017 | Nesta et al. | |
| 2017/0256271 A1 | 9/2017 | Lyon et al. | |
| 2017/0347219 A1 | 11/2017 | McCauley et al. | |
| 2018/0012587 A1 | 1/2018 | Meredith et al. | |
| 2018/0122354 A1 | 5/2018 | Boesen | |
| 2018/0225079 A1 | 8/2018 | Kotteri et al. | |
| 2018/0315412 A1 | 11/2018 | Meredith et al. | |
| 2019/0005940 A1 | 1/2019 | Boesen | |
| 2019/0080710 A1* | 3/2019 | Zhang | G10L 21/0232 |
| 2019/0130885 A1 | 5/2019 | Kemmerer et al. | |
| 2019/0237086 A1 | 8/2019 | Huang et al. | |
| 2019/0304427 A1 | 10/2019 | Kemmerer et al. | |
| 2020/0081682 A1* | 3/2020 | Vestal | H04L 65/611 |
| 2020/0098346 A1 | 3/2020 | Kemmerer et al. | |
| 2020/0304842 A1 | 9/2020 | Kumar et al. | |
| 2020/0304845 A1 | 9/2020 | Kumar et al. | |
| 2020/0342883 A1 | 10/2020 | Huang et al. | |
| 2021/0051379 A1 | 2/2021 | Shah et al. | |
| 2021/0134258 A1 | 5/2021 | Boesen | |
| 2021/0204036 A1* | 7/2021 | Zhao | H04N 21/64 |
| 2021/0219027 A1 | 7/2021 | Shah et al. | |
| 2021/0287322 A1 | 9/2021 | Yaffe et al. | |
| 2021/0352338 A1 | 11/2021 | Kumar et al. | |

* cited by examiner

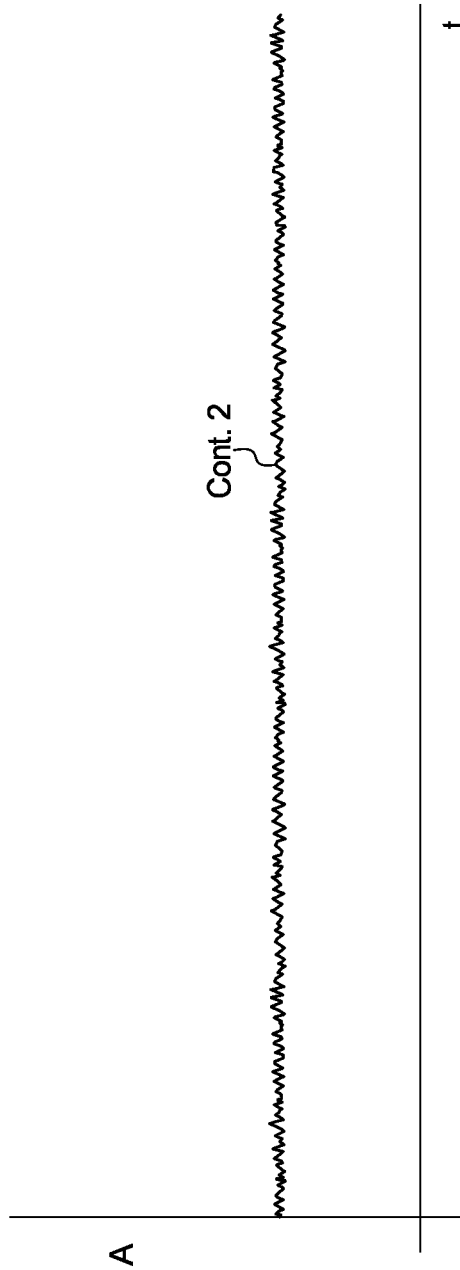
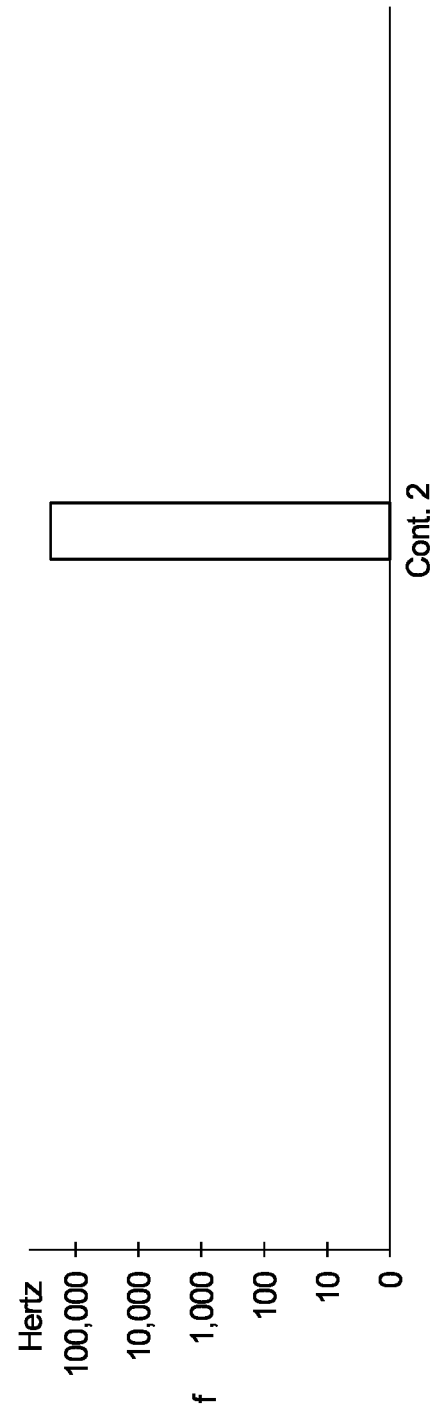

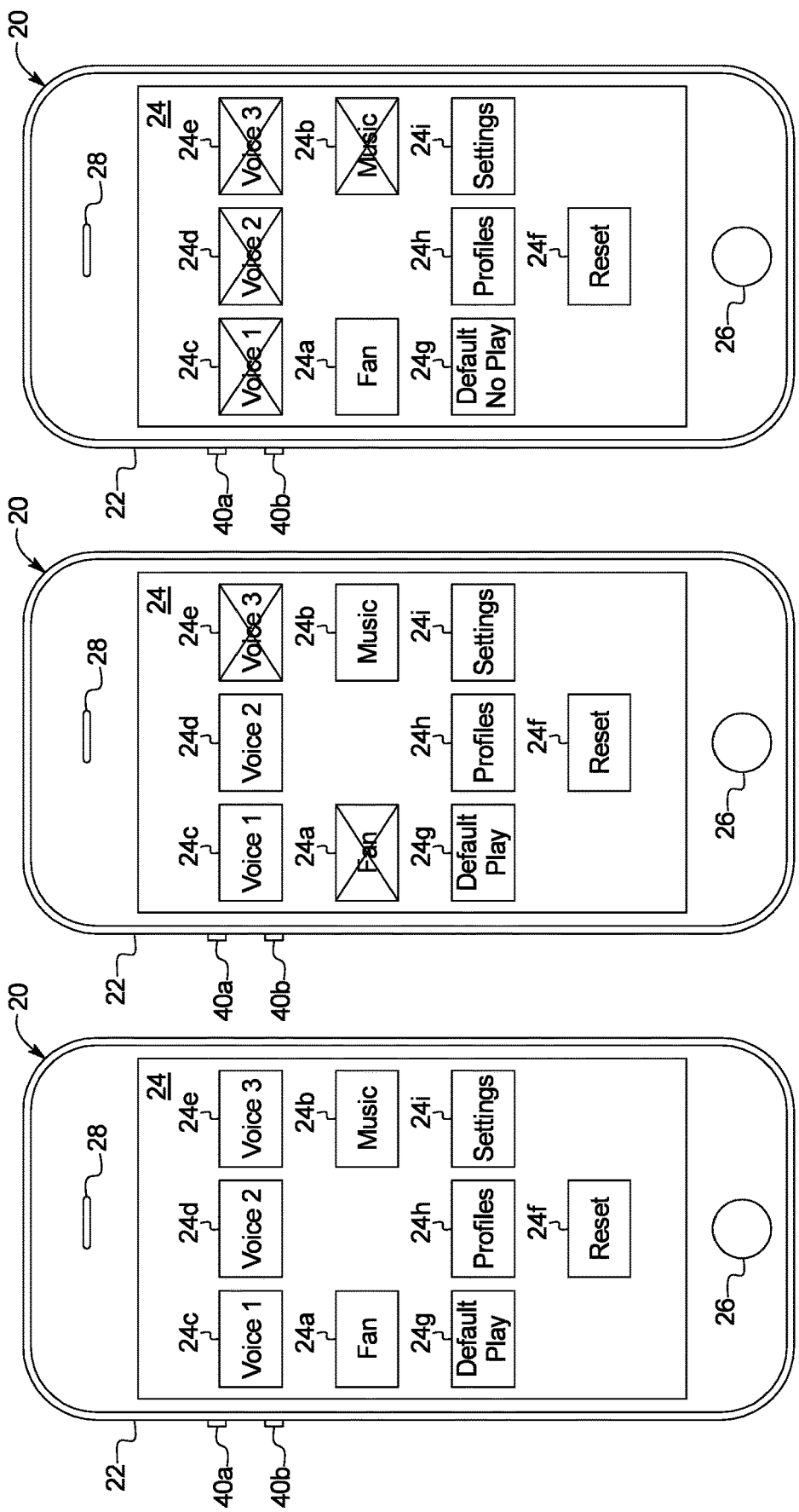

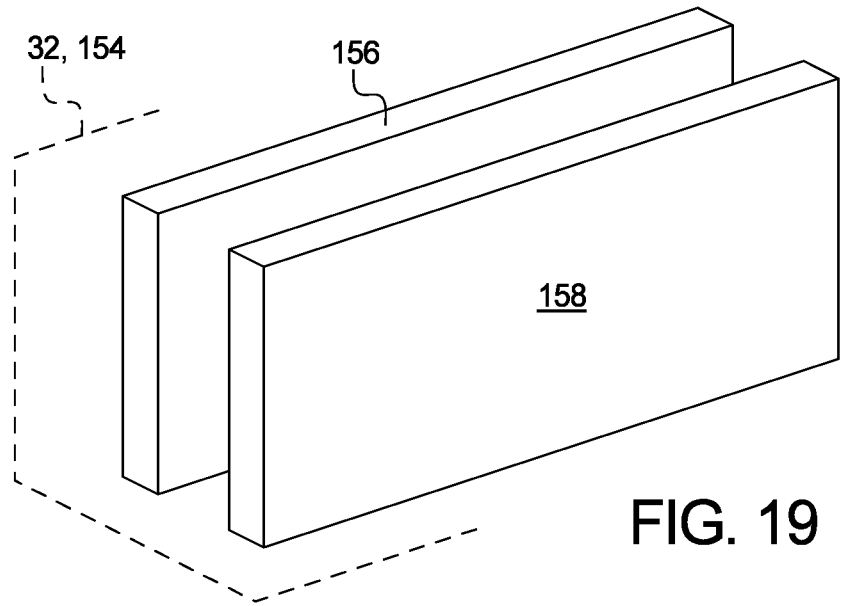
FIG. 19
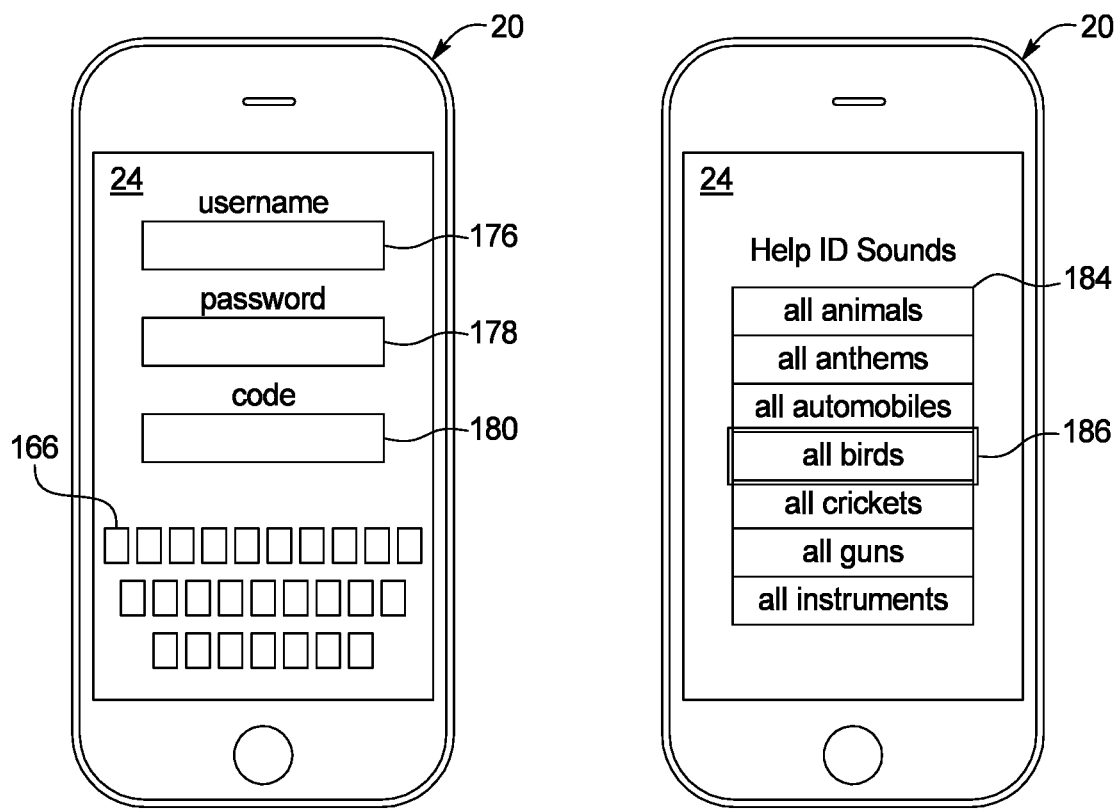
FIG. 20
FIG. 21

HEARING IMPROVEMENT SYSTEM

PRIORITY CLAIM

This application claims priority to and the benefit of U.S. Provisional Patent Application No. 62/958,085, filed Jan. 7, 2020, the entire contents of which are incorporated herein by reference and relied upon.

BACKGROUND

The present disclosure relates generally to hearing impairment and more specifically to wireless hearing impairment or improvement systems.

Hearing impairment or hearing loss is a partial or total inability to hear. Hearing loss may occur in one or both ears and may be temporary or permanent. In children, hearing problems can affect the ability to learn a spoken language. With adults, hearing loss causes work related difficulties and may lead to loneliness.

Hearing loss is typically diagnosed when a hearing test finds that a person is unable to hear twenty-five decibels in at least one ear. Based upon the test results, the hearing loss is categorized as mild, moderate, moderate-severe, severe or profound. Hearing loss is caused by a number of factors, including: genetics, birth complications, ageing, exposure to noise, infections, ear trauma, and via certain medications and toxins. For example, chronic ear infections may result in hearing loss. Infections during pregnancy, such as syphilis and rubella, may also cause hearing loss in a newborn child. Testing for poor hearing is recommended accordingly for all newborns.

There are three main types of hearing loss: conductive hearing loss, sensorineural hearing loss, and mixed hearing loss. Conductive hearing loss is present when sound does not reaching the inner ear, i.e., the cochlea, which occurs due to external ear canal malformation, dysfunction of the eardrum or malfunction of the bones of the middle ear. Sensorineural hearing loss is the most common type of and involves dysfunction of the inner ear, the cochlea or the nerve that transmits the impulses from the cochlea to the brain. The most common cause of sensorineural hearing loss is damage to the hair cells in the cochlea. Mixed hearing loss is a combination of conductive and sensorineural hearing loss.

As of 2018, hearing loss affects over a billion people. It causes disability in hundreds of millions of people. Hearing aids are used to combat hearing loss. Hearing aids operate to improve the hearing and speech comprehension of those with hearing by magnifying the sound vibrations in the ear to a level that may be understood by the impaired person. Hearing aids help many impaired people take part in everyday situations. Conversely, perhaps up to 40% of adults with hearing aids fail to use them, or do not use them to their full effect. There are many people who simply choose not to wear their hearing aids. There are a number of reasons for this, such as amplification of background noises instead of the sound patterns intended to be heard, issues with comfort, care, or maintenance of the device, and aesthetic factors.

A need exists accordingly for an improved hearing impairment device.

Discussed herein are situations in which a person or persons having normal hearing benefit from hearing certain desired noises but not hearing other noises, which just obscure or make the desired noises more difficult to hear. A need exists here for hearing improvement devices that aid people with normal hearing, which may be termed listening aids.

SUMMARY

The examples described herein disclose a system that in one embodiment aids the hearing impaired. The system may serve as a replacement for the person's hearing aid or as an alternative or option. The system uses the person's smartphone or other device (e.g., a tablet or computer, collectively "smart device") having memory to store a software application, a microphone, processor and transmitter to transmit audio data to an ear plug or ear piece (collectively "ear piece") worn by the user. The technology to wirelessly sync the user's smart device to the user's ear piece and to send audio data to same already exists. The present system leverages that technology in combination with the microphone of the smart device and software added to the smart device to take an audio signal received from the microphone, digitize the signal, break the digitized signal into distinct recognizable sound patterns, categorize the sound patterns, name the categorized patterns using names recognized by the user, display the named patterns on the smart device, enable the user to select for each named pattern whether to send or not send the pattern (turn the pattern on or off), and then send only the sound patterns selected by the user. In this manner, the smart device having the software of the present disclosure acts as a filter that allows the user to hear what the user wants to hear and to tune out other sound patterns or noises.

The named patterns are displayed on the smart device in one embodiment in real time or near real time so that when a sound is generated, it appears as a named pattern. When the sound is not currently being generated, it is not displayed as a named pattern. The software is configured in an embodiment, such that if the user turns off a particular pattern, the pattern stays off until the user decides to turn the pattern back on. This is done so that the user does not have to keep deactivating an intermittent or otherwise identified sound, such as a voice, every time the sound reappears on the smart device.

In one example, suppose the user is sitting in a room watching television. The television has multiple people talking and background music. Nearby, the user's family member is talking on their telephone. Along a wall of the room, a dehumidifier is running. All of these sound patterns are detected by the smart device's microphone. The user's smart device presents a named pattern corresponding to the fan of the dehumidifier, which produces a continuous sound of a white noise variety that the application recognizes as likely being a fan of some sort and therefore names the pattern "fan". The smart phone accordingly displays a "fan" icon that the user can toggle to either hear or not hear, that is, to have the dehumidifier sound wirelessly delivered to the user's earpiece or not.

The user's smart device will present a named pattern corresponding to the background television music when it is played. The software recognizes the sound pattern as a musical pattern and therefore names the pattern "music", which may be a single or multiple sources of music categorized as a single or multiple (e.g., one for each source) sound pattern. The music pattern may be generally continuous relative to a voice pattern and therefore appears on the user's smart device as a "music" icon. At any time while the "music" icon is displayed, the user may toggle it to either hear or not hear the music, that is, to have the music wirelessly delivered to the user's earpiece or not.

The software is able to discern between different voices by taking into consideration at least one of: (i) an average frequency and/or range of frequencies of a particular sound pattern identified as a voice pattern, (ii) an average amplitude and/or range of amplitudes of the particular vice pattern, (iii) a reflection or accent theme of the particular voice pattern (e.g., look for repetitive and consistent changes in amplitude and/or frequency, such as a repetitive sharp burst of sound being categorized as a dog barking). The software application in an embodiment is configured to look a first differentiator of (i), (ii) or (iii) to differentiate between two or more patterns deemed to be voice patterns. If the first differentiator is not capable of differentiating between the voice patterns, the software application looks to a second differentiator of (i), (ii) or (iii) to differentiate between two or more patterns. If the first and second differentiators are not capable of differentiating between the voice patterns, the software application looks to a third differentiator of (i), (ii) or (iii) to differentiate between two or more patterns. If the software application is unable to detect between two or more patterns after looking at all differentiators, the software deems the two or more patterns to be a single pattern and displays a single icon for same. The icon in an embodiment indicates to the user that the icon may be representing one or more voice.

Many smart devices have multiple microphones. It is contemplated for the software application of the present disclosure look for a difference between the sensing of the different microphones to determine a direction from which the sound pattern is coming. The difference may be any one or more of a difference in amplitude of the sound pattern signal reaching the different microphones and a difference in a time at which the sound pattern signal reaches the different microphones. The greater the amplitude or the sooner the signal is detected, the more likely that the sound is coming from a direction extending to the side of the smart device at which the microphone is located.

Each voice pattern is displayed as a voice icon in real time when the voice is detected by the microphone, e.g., "voice 1", "voice 2", "voice 3", etc. When displayed, the user may toggle any voice icon to activate or deactivate the sound pattern, e.g., to have any particular voice pattern wirelessly delivered to the user's earpiece or not. Once any sound pattern is deactivated (e.g., "fan", "music", "voice 1", "dog", etc.), a grayed-out icon, X'd-out icon or icon otherwise illustrating that it has been deactivated is displayed when it is sensed by the microphone, so that the user at any time may reactivate the sound pattern. Alternatively or additionally, once any sound pattern is deactivated, a deactivated icon for that pattern may be displayed in a deactivated portion of the screen of the smart device, so that the user may recall and reactivate the sound pattern at any time.

Multiple embodiments for activating and deactivating the sound pattern are described herein. Each embodiment may be provided alone or as a selectable mode option along with at least one other embodiment.

The software application in an embodiment provides a timeout feature in which a sound pattern is deleted if the sound is not detected by the microphone for a certain period of time. It is also contemplated to alternatively or additionally provide a "reset" button, which enables the user to wipeout or delete all existing sound patterns when the user's environment changes, e.g., the user enters a new room, leaves an automobile, enters an automobile, goes outside, comes inside, etc. The timeout and reset features help to declutter the display screen of the smart device.

It is further contemplated to provide profile buttons in which a certain selection automatically activates and deactivates predetermined sound patterns to achieve a desired objective. The profile may be preinstalled in the software application and/or be customized by the user. For example, a "sleep" profile may be preinstalled for which all incoming sound patterns are automatically deactivated. A second preinstalled sleep type of profile may be called "white noise" for which all incoming sound patterns except for a fan or white noise type of sound pattern are automatically deactivated. A customizable sleep pattern in one example allows the user to add the sound of their dog barking to the original "sleep" profile, which otherwise automatically deactivates all other sound patterns.

A "music only" profile may be preinstalled and/or user added in which the software application automatically deactivates all sound patterns deemed not to be a musical pattern. A "driving" profile may be preinstalled and/or user added in which the software application automatically deactivates all sound patterns deemed to be musical patterns and activates all other incoming sound patterns, so that the user may hear external noises and any voices in the automobile that may issue warnings. Of course, the user may deactivate any voices deemed to be unhelpful, such as that of a baby or small child.

The profiles are stored in an embodiment under a "profile" tab or dropdown menu, so that as many profiles as desired may be preinstalled and/or created by the user without cluttering the screen of the user's smart device.

It is contemplated for the software application to coordinate with the volume control of the smart device, so that the user can select the sound patterns to allow to reach the user's earpiece and the volume at which the sound patterns are received. The software application thereby enables the user to toggle the volume up and down until a desired volume is determined.

It should be appreciated that the embodiments set forth herein are not limited to people with hearing impairment or with hearing impairment at all and instead may be used for any application in which the user may desire to block out a certain one more sound pattern and/or emphasize another one or more sound pattern. Where a hearing aid may be thought of as a device that helps the hearing impaired hear better, people with normal hearing may use the system and methodology of the present disclosure as a listening aid to tune in and/or block out certain noises. In the listening aid application of the present disclosure, the hearing aid may instead include headphones, which form a listening aid. Moreover, where the hearing aid application of the present disclosure may be used for example for work, to prevent loneliness, or for learning, the listening aid application of the present disclosure may be used alternatively or additionally, for example, for hobbies, military uses, security uses, recreation, quality control and/or surveillance.

One example listening aid use is for military, law enforcement, government and/or security, in which the system filters different sound files for enemy or unfriendly gunfire. In this example, it is further contemplated to store sound files of known gun types and/or gun distances for comparison, so that the system may determine what type of gun is being used and/or how far away the gunfire is from the user. It is contemplated for the system of the present disclosure that the above-described sound matching involves artificial intelligence ("AI") and a database. Regarding AI, a learning database is provided in one embodiment that grows a community of identified sound patterns, so that the system is better able to match sound patterns over time and as the system is used more and more. The AI algorithm in an embodiment filters out the sound pattern to be matched by eliminating sound patterns that are not involved with the comparison.

The AI database may be a local database stored on the user's smart device, a cloud database, or a hybrid database including local and cloud storage. In any case, the database contains the sound files and may be organized in a grouped and hierarchical manner, such as all sounds>nature>insects>crickets. The database may contain other sound attributes, such as pause times between sound patterns, frequency and pitch for example.

In one local database example, a local processor operates with the local database to perform sound matching using an algorithm. The local processor interrogates the local database in an attempt to match a recorded sound pattern to a sound stored in the database. If a match is made, the local processor causes an icon and/or message to be displayed on the user's smart device. In an embodiment, if no match is made, the local processor asks the user to identify the sound and to provide any desired additional attribute information.

In one cloud database example, the local processor passes the recorded sound pattern to the cloud server to perform sound matching using an algorithm (could be same or different algorithm than local database algorithm). If a match is made, the cloud server causes the local processor to display an icon and/or message on the user's smart device. In an embodiment, if no match is made, the cloud server causes the local processor to ask the user to identify the sound and to provide any desired additional attribute information.

In one hybrid database example, the local processor operates with a local database to perform sound matching using an algorithm. The local processor interrogates the local database in an attempt to match a recorded sound pattern to a sound stored in the local database. If a match is made, the local processor causes an icon and/or message to be displayed on the user's smart device. In an embodiment, if no match is made, the local processor passes the recorded sound pattern to the cloud server to perform sound matching using an algorithm (could be same algorithm or different than local database algorithm). If a match is made, the cloud server causes the local processor to display an icon and/or message on the user's smart device. In an embodiment, if no match is made at either the local database or cloud database, the cloud server causes the local processor to ask the user to identify the sound and to provide any desired additional attribute information.

It should be appreciated that while the systems and methodology are illustrated herein as interfacing with the user via a smart device such as a smart phone, alternative smart devices are contemplated. For example, a voice input by a user to a virtual assistant (e.g., Siri™ and the like) is contemplated. Here, the user may say, "Assistant, turn off all human voices". The voice activated virtual assistant may be provided as part of the user's smart phone or as a standalone device. It is expressly contemplated that input from the users of any of systems and methods discussed herein may be via touch or tactile and/or via voice activation.

In light of the present disclosure and without limiting it in any way, in a first aspect of the present disclosure, which may be combined with any other aspect listed herein, a hearing improvement system for use with a user's smart device and earpiece/headphones includes: software stored on or accessed by a memory device of the smart device, the software configured to be executed by a processor of the smart device or a server processor to (i) cause an audio signal received from a microphone of or operating with the smart device if containing two or more sound patterns to be separated into a plurality of individualized sound patterns; (ii) categorize the individualized sound patterns; (iii) display an icon representing each categorized sound pattern on a screen of the smart device; (iv) enable a user viewing the icons to at least one of deactivate or activate each of the individualized sound patterns; and (v) cause each of the non-deactivated individualized sound patterns to be delivered to the user's earpiece/headphones.

In a second aspect of the present disclosure, which may be combined with any other aspect listed herein, the hearing improvement system is configured to initially activate each of the individualized sound patterns and to enable the user to deactivate any of the activated sound patterns.

In a third aspect of the present disclosure, which may be combined with any other aspect listed herein, the hearing improvement system is configured to initially not activate any of the individualized sound patterns and to enable the user to activate any of the non-activated sound patterns.

In a fourth aspect of the present disclosure, which may be combined with any other aspect listed herein, the hearing improvement system is configured to separate the audio signal into at least two sound patterns by analyzing at least one of: (i) an average frequency and/or range of frequencies difference between the at least two sound patterns, (ii) an average amplitude and/or range of amplitudes difference between the at least two sound patterns, or (iii) a reflection or accent theme difference between the at least two sound patterns.

In a fifth aspect of the present disclosure, which may be combined with any other aspect listed herein, the hearing improvement system is configured to separate the audio signal into at least two sound patterns by (a) analyzing one of (i), (ii) or (iii), (b) if unable to discern between any two sound patterns, then analyzing another one of (i), (ii) or (iii), and (c) if unable to discern between any two sound patterns, then analyzing a third one of (i), (ii) or (iii).

In a sixth aspect of the present disclosure, which may be combined with any other aspect listed herein, the hearing improvement system is configured such that at least one of (i) a sound pattern deactivated by the user may be reactivated, or (ii) a sound pattern activated by the user may be re-deactivated.

In a seventh aspect of the present disclosure, which may be combined with any other aspect listed herein, the hearing improvement system includes at least one selectable profile displayed on the screen of the smart device, the profile when selected automatically deactivating predetermined ones of the sound patterns.

In an eighth aspect of the present disclosure, which may be combined with any other aspect listed herein, at least one selectable profile is provided as a sleep profile, a music only profile, or a driving profile.

In a ninth aspect of the present disclosure, which may be combined with any other aspect listed herein, the hearing improvement system is configured to provide a timeout feature in which a sound pattern is deleted if its associated sound is not detected by the microphone for a period of time.

In a tenth aspect of the present disclosure, which may be combined with any other aspect listed herein, the hearing improvement system is configured to provide a reset feature, which enables the user to delete all existing sound patterns.

In an eleventh aspect of the present disclosure, which may be combined with any other aspect listed herein, the audio signal or the individualized sound patterns are digitized for operation with the processor.

In an twelfth aspect of the present disclosure, which may be combined with any other aspect listed herein, a hearing improvement system for use with a user's smart device and earpiece/headphones includes software stored on or accessed by a memory device of the smart device, the software configured to be executed by a processor of the smart device or a server processor to (i) cause an audio signal received from a microphone of or operating with the smart device if containing two or more sound patterns to be separated into a plurality of individualized sound patterns; (ii) categorize the individualized sound patterns; (iii) display an icon representing each categorized sound pattern on a screen of the smart device; (iv) enable the user viewing the icons to adjust a volume level for each of the individualized sound patterns; and (v) cause the volume adjusted sound patterns to be delivered to the user's earpiece/headphones.

In an thirteenth aspect of the present disclosure, which may be combined with any other aspect listed herein, the hearing improvement system includes at least one volume adjuster displayed on the screen of the smart device to adjust the volume level for each of the sound patterns.

In a fourteenth aspect of the present disclosure, which may be combined with any other aspect listed herein, the at least one volume adjuster includes a separate adjuster associated with each displayed icon.

In a fifteenth aspect of the present disclosure, which may be combined with any other aspect listed herein, the volume level for each sound pattern is adjusted as a percentage of a maximum volume.

In a sixteenth aspect of the present disclosure, which may be combined with any other aspect listed herein, a hearing improvement system for use with a user's smart device and earpiece/headphones includes a plurality of icons displayed on a screen of the smart device, each icon corresponding to a sound pattern obtained from an audio signal received via a microphone of or operating with the smart device, each displayed icon selectable to at least one of deactivate or activate the associated sound pattern; and wherein the associated sound patterns are formed by at least one of (i) analyzing differences between average frequencies and/or ranges of frequencies of the associated sound patterns, (ii) analyzing differences between average amplitudes and/or ranges of amplitudes of the associated sound patterns, or (iii) analyzing differences between reflections or accent themes of the associated sound patterns.

In a seventeenth aspect of the present disclosure, which may be combined with any other aspect listed herein, the hearing improvement system is configured to enable a user to select between at least two operational modes, wherein the operational modes may include, possibly among others, (i) a default activate mode, (ii) a default non-activate mode, or (iii) a volume adjust mode.

In an eighteenth aspect of the present disclosure, which may be combined with any other aspect listed herein, the hearing improvement system is configured to gray-out or otherwise designate each deactivated or non-activated icon so that the icon is identifiable for later activation.

In a nineteenth aspect of the present disclosure, which may be combined with any other aspect listed herein, a hearing improvement system for use with a user's smart device includes a voice activated virtual assistant provided by the smart device or in communication with the smart device; software stored on or accessed by a memory device of the smart device, the software configured to be executed by a processor of the smart device or a server processor to (i) cause an audio signal received from a microphone of or operating with the smart device or the virtual assistant if containing two or more sound patterns to be separated into a plurality of individualized sound patterns; (ii) categorize the individualized sound patterns; (iii) enable a user to at least one of deactivate or activate each of the individualized sound patterns via the virtual assistant; and (iv) cause each of the non-deactivated individualized sound patterns to be delivered to the user's earpiece/headphones and/or to be played by a speaker of the virtual assistant.

In a twentieth aspect of the present disclosure, which may be combined with any other aspect listed herein, a hearing improvement system for use with a user's smart device and earpiece/headphones includes software stored on or accessed by a memory device of the smart device, the software configured to be executed by a processor of the smart device or a server processor to (i) enable a user to preselect at least one sound pattern from a plurality of sound patterns or at least one sound pattern category from a plurality of sound pattern categories; (ii) analyze an audio signal received from a microphone of or operating with the smart device to determine if the audio signal includes the at least one preselected sound pattern or at least one sound pattern from the at least one preselected sound pattern category; and (iii) cause each of the received at least one preselected sound pattern or at least one sound pattern from the at least one preselected sound pattern category to be delivered to the user's earpiece/headphones.

In a twenty-first aspect of the present disclosure, which may be combined with any other aspect listed herein, the smart device is configured to display a selector enabling the user to preselect the at least one sound pattern from the plurality of sound patterns or the at least one sound pattern category from the plurality of sound pattern categories.

In a twenty-second aspect of the present disclosure, which may be combined with any other aspect listed herein, the smart device is configured to display a drop down menu enabling the user to preselect the at least one sound pattern from the plurality of sound patterns or the at least one sound pattern category from the plurality of sound pattern categories.

In a twenty-first aspect of the present disclosure, which may be combined with any other aspect listed herein, the smart device is configured to display a keypad enabling the user to preselect the at least one sound pattern from the plurality of sound patterns or the at least one sound pattern category from a plurality of sound pattern categories.

In a twenty-third aspect of the present disclosure, any of the structure and functionality disclosed in connection with FIGS. 1 to 25 may be included or combined with any of the other structure and functionality disclosed in connection with FIGS. 1 to 25.

In light of the present disclosure and the above aspects, it is therefore an advantage of the present disclosure to provide an improved system for the hearing impaired.

It is another advantage of the present disclosure to provide sound pattern selectivity so that the user only hears desired sound patters.

It is a further advantage of the present disclosure to provide sound pattern profiles in which a certain profile selection automatically activates and deactivates predetermined sound patterns to achieve a desired objective.

It is still another advantage of the present disclosure to provide adjustable sound pattern volume so that the user may set the desired sound patterns at a desired volume delivered to the user's earpiece.

The advantages discussed herein may be found in one, some, but perhaps not all of the embodiments disclosed herein. Additional features and advantages are described herein, and will be apparent from, the following Detailed Description and the figures.

BRIEF DESCRIPTION OF THE FIGURES

FIG. 4A is another schematic diagram of the plot of FIG. 2A in which all sound patterns except for a certain continuous sound pattern have been deactivated via the software application of the present disclosure.

FIG. 4B illustrates the corresponding frequency range for the remaining sound pattern of FIG. 4A.

FIG. 5 is an elevation view of one embodiment of a screen of a user's smart device having the software application of the present disclosure and displaying the sound pattern icon status corresponding to FIGS. 2A and 2B.

FIG. 6 is an elevation view of one embodiment of a screen of a user's smart device having the software application of the present disclosure and displaying the sound pattern icon status corresponding to FIGS. 3A and 3B.

FIG. 7 is an elevation view of one embodiment of a screen of a user's smart device having the software application of the present disclosure and displaying the sound pattern icon status corresponding to FIGS. 4A and 4B.

FIG. 19 is a schematic illustration showing software of any of the systems of the present disclosure operating in the background, while a music application or a website stream is generating sound patterns at the user's earpiece.

FIG. 20 is an elevation view of a screen of a user's smart device illustrating one embodiment for enabling a group of users to form proprietary sound identification files under the system of FIG. 14.

FIG. 21 is an elevation view of a screen of a user's smart device illustrating one embodiment for enabling a user to select a category of unidentified sound patterns for which the user intends to provide identification and subclassification.

DETAILED DESCRIPTION

Figure 1:
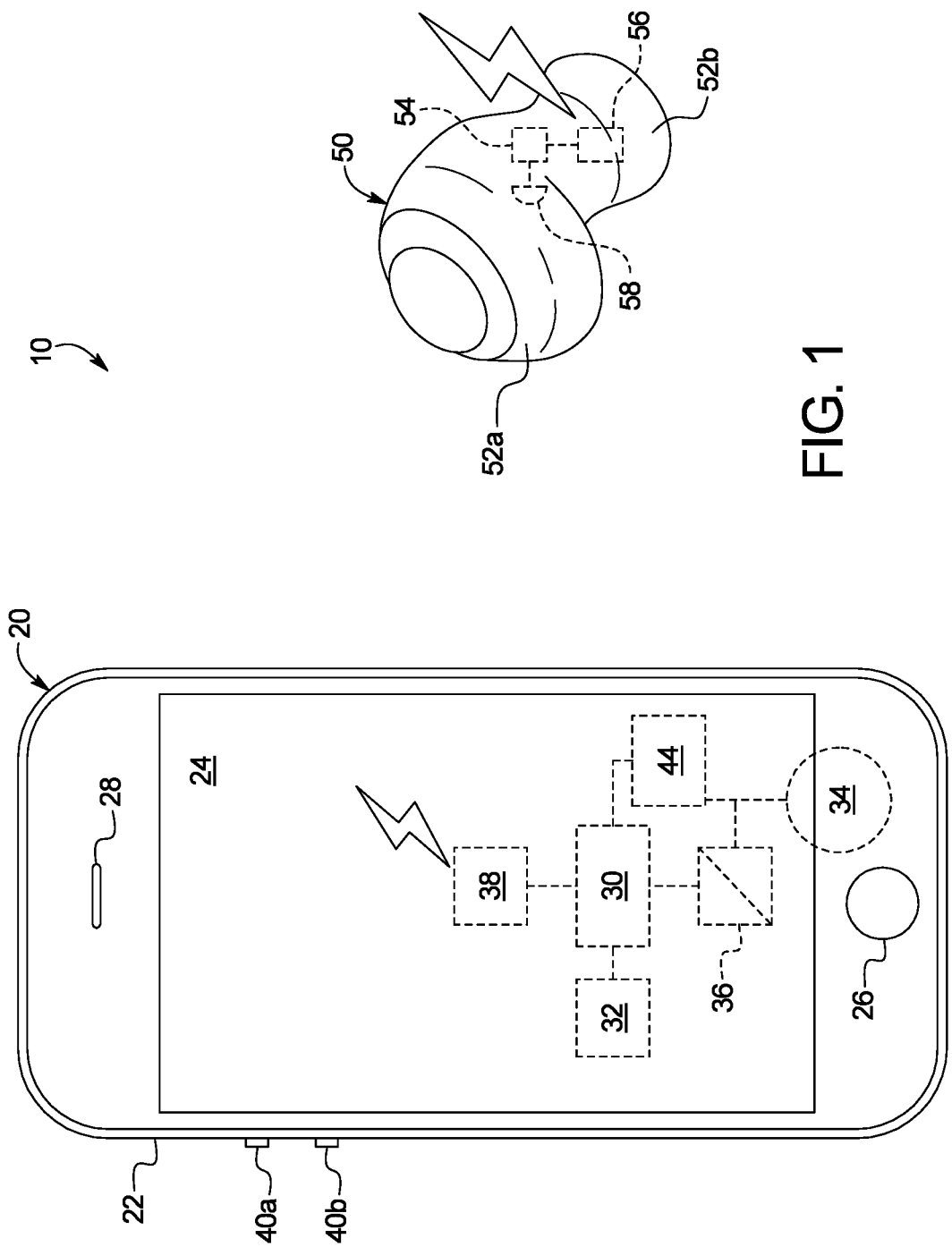
FIG. 1 is a perspective view of one embodiment of one system of the present disclosure illustrating a user's smart device used in combination with the user's earpiece.

Referring now to the drawings and in particular to FIG. 1, hearing impairment or improvement system 10, incorporating multiple embodiments of the present disclosure, is illustrated. Hearing impairment or improvement system 10 includes a smart device 20, which may be any type of smartphone, tablet, computer or voice activated virtual assistant (e.g., Siri™ and the like) having the structure and functionality capable of performing the tasks described herein. In the illustrated embodiment, smart device includes a housing 22 having a display screen 24 for displaying any of the sound pattern icons described herein. In one embodiment, display screen 24 is of a touch variety having a touch screen overlay that allows the user to enter data and make selections by touching display screen 24 directly. Alternatively or additionally, smart device 20 provides one or more electromechanical input device 26 for making user selections and entering data.

Housing 22 holds one or more speaker 28 for audio output to the user. One or more speaker 28 may or may not be deactivated during operation of hearing impairment or improvement system 10 of the present disclosure. That is, the one or more speaker 28 is not needed during operation of system 10 and may only serve to cause confusion. In one embodiment, speaker 28 is activated for incoming calls to a smart device 20, and system 10 is configured to allow for the incoming calls to be heard via speaker 28 regardless of any user selections made in the present software application. The one or more speaker may be under control of a processor 30 or a separate sound card or controller (not illustrated) that is in data and/or signal communication with processor 30. Similarly, a separate video card or controller (not illustrated) may be provided to interface between display screen 24.

In FIG. 1, processor operates 30 with a memory device 32 that stores information accessible to the processor. Memory device 32 stores, for example, the application or software that is downloaded to smart device, e.g., wirelessly, for operating hearing impairment or improvement system 10. The software application may be browser- or cloud-based, a local application or a hybrid of same. The software via memory device 32 stores selections made by the user as discussed herein. The stored selections drive processor 30 to command the video card or controller to cause display screen 24 to display in a corresponding way. The stored selections also drive processor 30 to cause user selected sound patterns to be delivered to earpiece(s) 50. Earpiece(s) 50 include (i) any type of wired or wireless device placed in the user's ear, such as a hearing aid or speaker inserted into the ear, or (ii) any type of wired or wireless device worn around the user's ear, such as headphones.

It should be appreciated that the software or application once launched and operated as described herein may be minimized at any time by the user, so that the user may perform other functions using smart device 20, while the present application operates in the background. When the user wishes to make a setting change in the software application, the user presses an application icon on display screen 24 of smart device 20 to redisplay the application on screen 24.

Housing 22 in the illustrated embodiment additionally holds one or more microphone 34, which is (are) placed in positions to detect incoming sound patterns. The incoming sound patterns are sensed by microphone 34 as analog signals, which are then converted to digital signals via analog to digital (A/D) converter 36, which outputs corresponding digital sound signals to processor 30. Depending upon the user's sound pattern selections discussed below, and stored in memory device 32 via the downloaded software, processor 30 either allows or does not allow a particular sound pattern to be transmitted wirelessly via a transmitter or transceiver 38 to earpiece 50. It is contemplated that wireless communication between smart device 20 and earpiece 50 is one-way, i.e., from smart device 20 to earpiece 50, such that wireless enabler 38 may be a transmitter. It is possible however that wireless communication between smart device 20 and earpiece 50 is two-way, such that wireless enabler 38 is a transceiver. In either case, wireless communication between smart device 20 and earpiece 50 may be via Bluetooth, Wi-Fi, ZigBee, or other suitable wireless protocol, currently known or developed in the future.

Earpiece 50 in the illustrated embodiment of FIG. 1 includes a housing having an ear insertion portion 52*a* and a sound receiving/playing portion 52*b*. Housing 52*a*/52*b* houses sound processing electronics 54, which operate with a wireless receiver or transceiver 56 and one or more speaker 58. It is again contemplated that wireless communication between smart device 20 and earpiece 50 is one-way, i.e., from smart device 20 to earpiece 50, such that wireless enabler 56 may be a receiver. It is possible however that wireless communication between smart device 20 and earpiece 50 is two-way, i.e., such that wireless enabler 56 is a transceiver. System 10 is configured such that receiver or transceiver 56 receives sound patterns wirelessly from transmitter or transceiver 38 that have been activated by the user, and wherein sound patterns deactivated by the user are not delivered to receiver or transceiver 56.

Sound processing electronics 54 may include a processor, a memory, a sound card or controller, and an amplifier that work in combination to deliver selected sound patterns to speaker 58, which outputs the selected sound patterns to the user. FIG. 1 further illustrates that smart device 20 includes audio-up adjuster 40*a* and audio-down adjuster 40*b*. The user's selected audio adjustment level is part of a larger wireless transmission or a discrete wireless transmission from smart device 20 to earpiece 50, causing sound processing electronics 54 to set its amplifier at a level commensurate with the user's selected audio level. In one embodiment, the user's selected audio level is applied to each selected sound pattern wirelessly delivered from smart device 20 to earpiece 50. It should be appreciated that while FIG. 1 illustrates a single earpiece 50, the user of system 10 may wear two earpieces 50 that are identical except for housing portions 52*a* and 52*b* being configured for a left ear or a right ear.

Figure 2A:
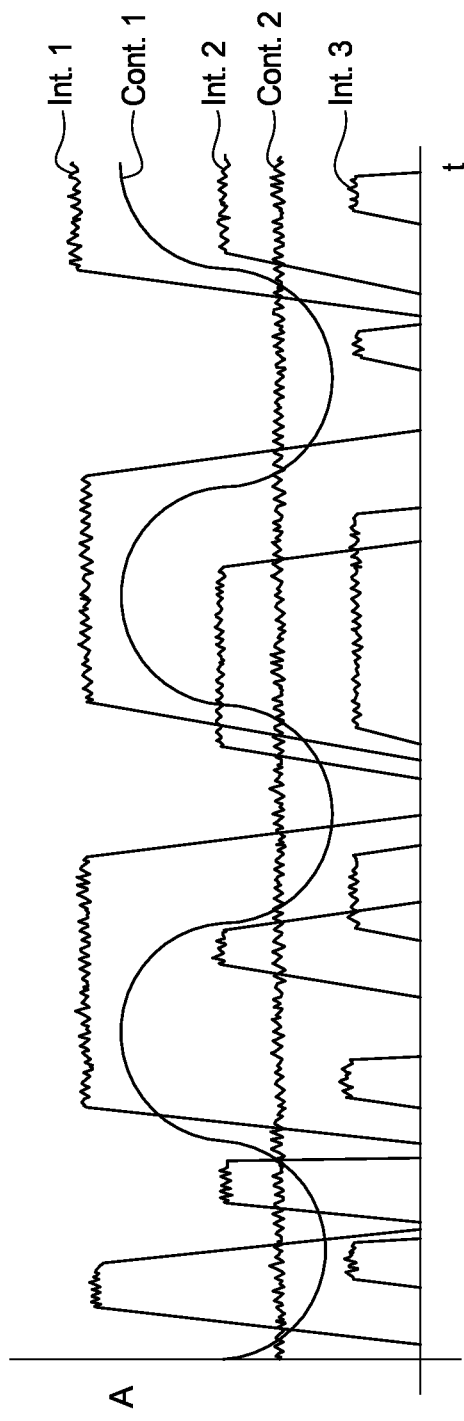
FIG. 2A is a schematic diagram illustrating a plot of different sound pattern amplitudes over time that form an overall set of sound patterns that the user may select to receive at the user's earpiece.
Figure 2B:
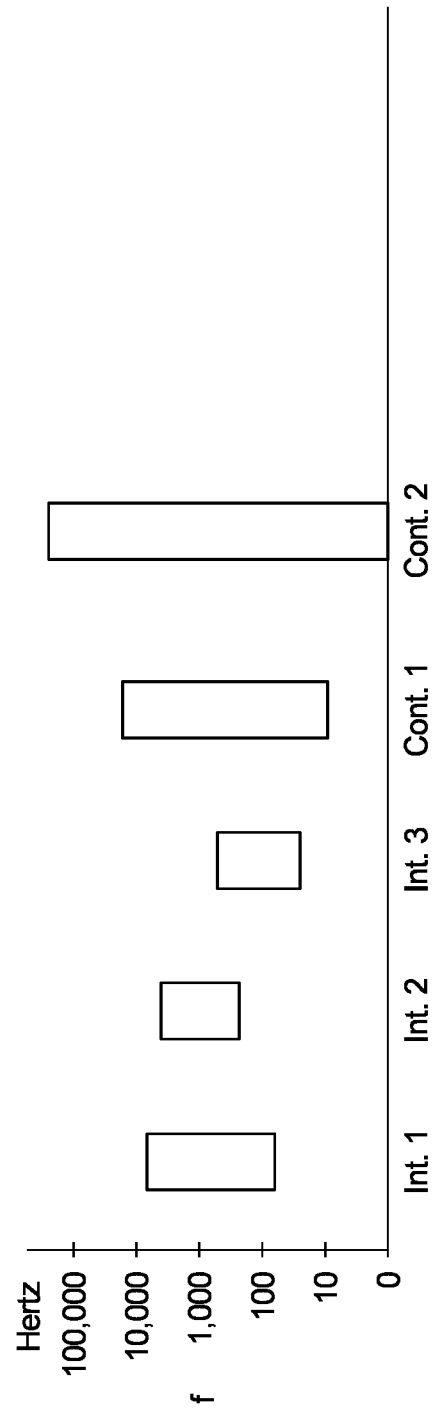
FIG. 2B is a schematic diagram illustrating a plot of different sound pattern frequencies for each of the sound patterns illustrated in FIG. 2A.

Referring now to FIGS. 2A and 2B, plots of amplitude and frequency for multiple sound patterns are illustrated. Using the example discussed in the SUMMARY, suppose the user is sitting in a room watching television. The television has multiple people talking and background music. The television voices are illustrated in FIGS. 2A and 2B as sound pattern Intermittent 1 ("Int. 1") and sound pattern Intermittent 2 ("Int. 2"). The background music is illustrated in FIGS. 2A and 2B as sound pattern Continuous 1 ("Cont. 1"). Nearby, the user's family member is talking on his or her telephone. Along a wall of the room, a dehumidifier is running. The family member's voice is illustrated in FIGS. 2A and 2B as sound pattern Intermittent 3 ("Int. 3"). The dehumidifier noise is illustrated in FIGS. 2A and 2B as sound pattern Continuous 2 ("Cont. 2").

Each of Int. 1 to Int. 3, Cont. 1 and Cont. 2 are detected by one or more microphone 34 of smart device 20. The sound patterns are digitized at A/D converter 36 and delivered to processor 30 (or intermediate sound controller or card). As discussed in detail below, at least a portion or snippet of the sound pattern may be saved in memory device 32 or the memory device of a separate sound card or controller (not illustrated). Depending upon whether the user decides to activate the sound pattern, processor 30 may or may not cause the sound pattern to be sent wirelessly via transmitter or transceiver 38 to the user's earpiece(s) 50.

FIGS. 2A and 2B illustrate that voice pattern Int. 1 is generally louder than voice patterns Int. 2 and Int. 3, with voice pattern Int. 2 generally being louder than Int. 3. Voice pattern Int. 1 also has the largest frequency range and tops out at the highest frequency of Int. 1 to Int. 3, while Int. 3 bottoms out at the lowest frequency. FIG. 2A further illustrates that music pattern Cont. 1 has a harmonic amplitude profile, while dehumidifier noise pattern Cont. 2 has a static amplitude profile. FIG. 2B illustrates that Cont. 2 also has a large frequency range, indicative of white noise.

The software of the present disclosure stored at memory device 32 and processed at processor 30 analyzes each of the incoming sound patterns so that the sound patterns may be categorized and labeled. The analysis of the sound patterns includes an analysis of its amplitude and frequency. When a sound pattern is detected, the software records its amplitude (and/or amplitude range), frequency (and/or frequency range), and type, e.g., intermittent versus continuous. Based upon these factors, the software may categorize the sound pattern as an existing sound pattern or a new sound pattern. If the sound pattern is determined to be an existing sound pattern, and the user has already chosen to activate or deactivate the pattern, the software complies with the user's selection and accordingly causes or does not cause the sound to be transmitted to the user's earpiece(s) 50. If the sound pattern is determined to be a new sound pattern, the software causes a new icon corresponding to the new sound to be displayed, wherein the user may select whether to hear the sound pattern or not pursuant to the methods described below.

Figure 3A:
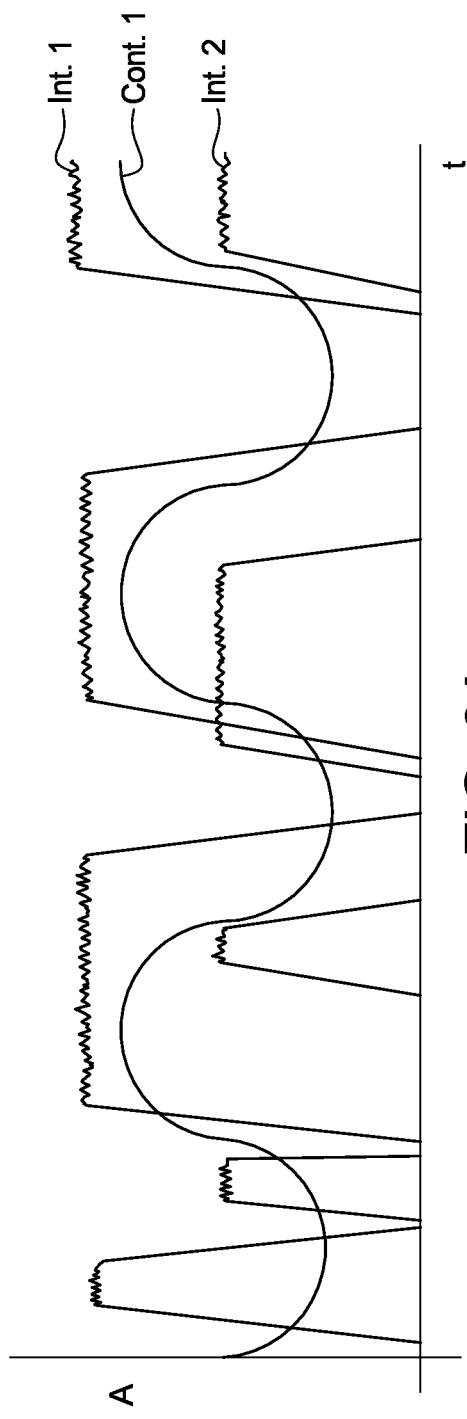
FIG. 3A is a schematic diagram of the plot of FIG. 2A in which certain voice sound patterns and a certain continuous sound pattern have been deactivated via the software application of the present disclosure so that the user only hears desired sound patterns.
Figure 3B:
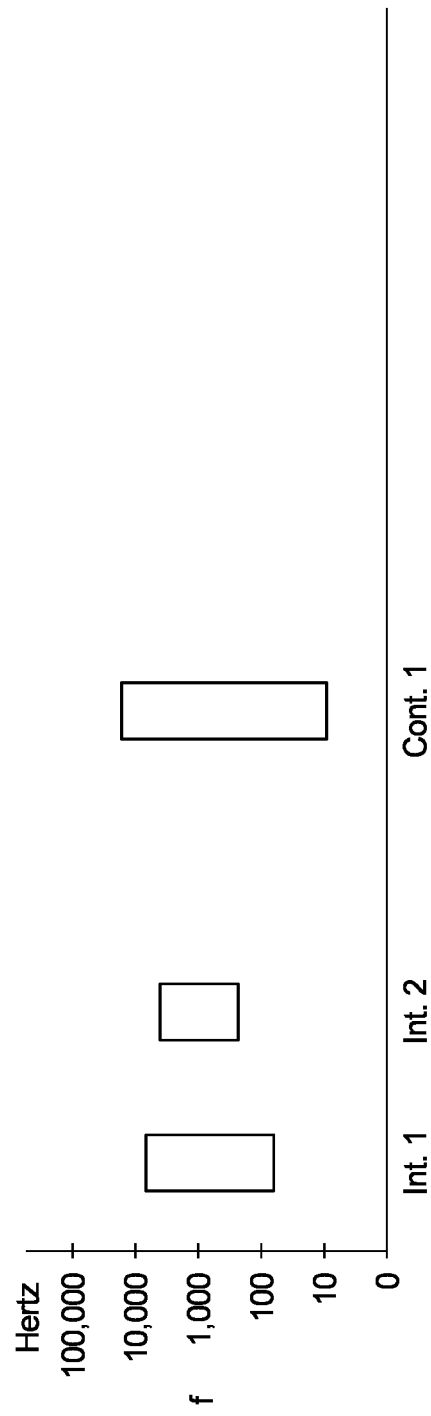
FIG. 3B illustrates the corresponding frequency ranges for the remaining sound patterns of FIG. 3A.

In the example of FIGS. 3A and 3B, the user wants to hear all television sound patterns and deactivate all other voices and noises. The user accordingly keeps television voice patterns Int. 1 and Int. 2 and television background music Cont. 1. The user deactivates family member voice pattern Int. 3 and dehumidifier noise Cont. 2. FIGS. 3A and 3B illustrate the plots of amplitude and frequency, respectively, for the remaining sound patterns after eliminating unwanted sound patterns.

In the example of FIGS. 4A and 4B, the user wants to sleep and eliminate all sound patterns except for the dehumidifier noise, which helps to user to sleep. The user accordingly keeps dehumidifier noise Cont. 2 and deactivates television voice patterns Int. 1 and Int. 2, television background music Cont. 1, and family member voice pattern Int. 3. FIGS. 4A and 4B illustrate the plots of amplitude and frequency, respectively, for the remaining sound pattern after eliminating the other sound patterns.

Referring now to FIG. 5, display screen 24 presents a named pattern corresponding to the fan of the dehumidifier, which produces a continuous sound of a white noise variety that the application using processor 30 and memory 32 recognizes as likely being a fan of some sort and therefore names the pattern "fan". Display screen 24 accordingly continuously displays a "fan" icon 24*a* that the user can toggle as described below to either hear or not hear, that is, to have the dehumidifier sound pattern wirelessly delivered to the user's earpiece(s) 50 or not.

Display screen 24 also presents a named pattern corresponding to the music of the movie or television show, which produces a continuous or semi-continuous sinusoidal sound pattern that the application using processor 30 and memory 32 recognizes as likely being music and therefore names the pattern "music". Display screen 24 accordingly continuously displays a "music" icon 24*b* that the user can toggle as described below to either hear or not hear, that is, to have the music sound pattern wirelessly delivered to the user's earpiece(s) 50 or not.

Display screen 24 also presents a named pattern corresponding to each of the voices of the movie or television show and the family member in the room on the telephone, which produces intermittent sound patterns that the application using processor 30 and memory 32 recognizes as likely being people talking and therefore names the patterns "voice 1", "voice 2" and "voice 3". Display screen 24 accordingly continuously displays a "voice 1" icon 24*c* that the user can toggle as described below to either hear or not hear, that is, to have the voice 1 sound pattern wirelessly delivered to the user's earpiece(s) 50 or not. Display screen 24 also continuously displays a "voice 2" icon 24*d* that the user can toggle as described below to either hear or not hear, that is, to have the voice 2 sound pattern wirelessly delivered to the user's earpiece(s) 50 or not. Display screen 24 further continuously displays a "voice 3" icon 24*e* that the user can toggle as described below to either hear or not hear, that is, to have the voice 3 sound pattern wirelessly delivered to the user's earpiece(s) 50 or not.

In FIG. 6, display screen 24 shows the user selected settings of FIGS. 3A and 3B, namely, where the music and movie or television voices have been activated and the dehumidifier sound pattern and telephone person's voice have been deactivated. The "fan" icon 24*a* and the "voice 3" icon 24*e* are shown accordingly as being X-d out (or darkened or grayed-out), while television or movie "music" icon 24*b*, "voice 1" icon 24*c* and "voice 2" icon 24*d* are shown as being activated.

In FIG. 7, display screen 24 shows the user selected settings of FIGS. 4A and 4B, namely, where only the dehumidifier sound pattern is activated to aid the user with sleep. The "music" icon 24*b*, "voice 1" icon 24*c*, "voice 2" icon 24*d*, and "voice 3" icon 24*e* are shown accordingly as being X-d out (or darkened or grayed-out), while "fan" icon 24*a* is shown as being activated.

It is contemplated for system 10 to operate in one of at least two modes, which may be user selectable. In a first mode, when microphone 34 of smart device 20 detects a new sound pattern, it is digitized at A/D converter 36, delivered to processor 30, which operates with memory 32 to categorize the sound pattern, e.g., into a "voice" pattern, a "music" pattern, a "fan" pattern, etc. Processor 30 causes a corresponding new icon to be displayed on display screen 24 and allows the new sound pattern to be delivered via transmitter/receiver 38, 56 or transceiver/transceiver 38, 56 to earpiece(s) 50. Processing electronics 54 of earpiece(s) 50 plays the delivered sound pattern to the user via one or more speaker 58. In an embodiment, processor 30 of smart device 20 also causes the new icon to flash and/or a vibrator (not illustrated) within smart device 20 to provide haptic feedback, which lets the user know that a new sound has been detected. The user can also hear the new sound since it has been delivered to earpiece(s) 50. The user is at any point afterwards allowed to press the corresponding icon to deactivate the sound pattern. In an embodiment, a visual indication of deactivation is provided, such as darkening the icon and/or placing an "X" over the icon. The sound pattern is thereafter no longer delivered to earpiece(s) 50. The user may at anytime thereafter repress the corresponding icon to reactivate the sound pattern. In an embodiment, a visual indication of reactivation is provided, such that the darkening of the icon and/or the "X" is removed. The sound pattern is thereafter delivered to earpiece(s) 50. The user can toggle back and forth between deactivation and reactivation as many times as desired.

Figure 8:
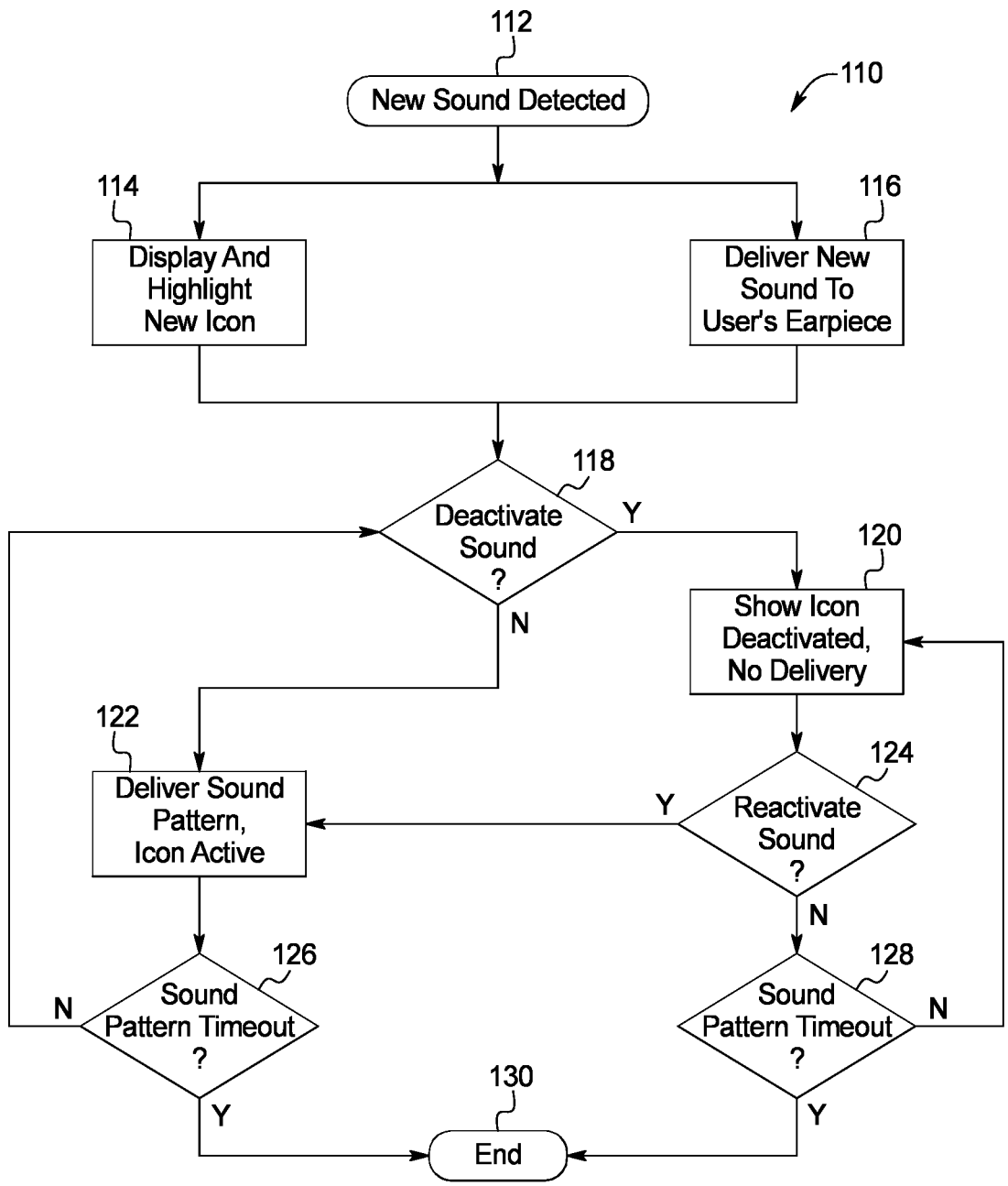
FIG. 8 is a schematic flowchart illustrating one embodiment of the present disclosure, wherein incoming sound patterns are automatically activated, and which allows the user to deactivate the sound patterns if desired.

The first mode just described is illustrated in a flowchart manner in FIG. 8 via method 110. At oval 112, a new sound is detected and method 110 begins. At blocks 114 and 116, respectively, smart device 20 causes a new icon to be displayed and highlighted and the sound pattern to be delivered to and played by earpiece(s) 50. At diamond 118, the user is able to select to deactivate the sound pattern by pressing its corresponding icon. If the user selects to deactivate the sound pattern, then the icon is indicated as deactivated in any manner described above and the sound pattern is deactivated and not sent to earpiece(s) 50, as indicated at block 120. If the user does not select to deactivate the sound pattern (e.g., does nothing), then the icon is displayed as normal and the sound pattern remains activated and continues to be sent to earpiece(s) 50, as indicated at block 122. The arrow from block 122 back to diamond 118 indicates that the user can choose to deactivate the sound pattern at any time.

If the user has deactivated the sound as indicated at block 120, the user at diamond 124 is able to select to reactivate the sound pattern by pressing its corresponding icon. If the user selects to reactivate the sound pattern, then the icon is changed to its activated, e.g., normal, display and the sound pattern is reactivated and sent to earpiece(s) 50, as indicated at block 122. If the user does not select to reactivate the sound pattern (e.g., does nothing), then the icon is indicated as deactivated in any manner described above and the sound pattern is deactivated and not sent to earpiece(s) 50, as indicated at block 120.

As illustrated in FIG. 8, two decision loops are created within method 110, namely, (i) between activation block 122 and deactivation selection diamond 118 and (ii) between deactivation block 120 and reactivation diamond 124. Those loops each include a timeout determination at timeout determination diamonds 126 and 128. It should be appreciated that processor 30 and memory 32 of earpiece(s) 50 perform method 110 for each detected sound pattern icon displayed on display screen 24. In an attempt to declutter display screen 24, it is contemplated to remove old sound patterns that are no longer relevant or sound producing by providing a timeout period for each sound pattern. If within a set period of time at diamonds 126 and 128, e.g., a user selectable time period, the existing sound pattern is detected at microphone 34, the loops discussed above are allowed to continue. But if after the set period of time at diamonds 126 and 128, the existing sound pattern is not detected at microphone 34, then the corresponding icon is removed from display screen 24 and method 110 for that particular sound pattern ends as indicated oval 130.

Because method 110 assumes that the user wants to hear each new sound pattern, any timed-out and removed sound pattern that reappears (e.g., television or movie actor not seen since the beginning of the show reappears) will automatically be played at earpiece without requiring the user to reactive the sound pattern. It is contemplated that the timeout feature be user selectable so that the user can turn the timeout feature off if desired. Alternatively or additionally to the timeout feature just described, it is contemplated to provide a "reset" button or feature 24f on display screen 24 of smart device as illustrated in FIGS. 5 to 7, which allows the user to cause processor 30 to remove all sound icons from display screen 24 and to start over.

As discussed above, system 10 may be run in any of a plurality of different modes, which may be user selectable. FIGS. 5 to 7 accordingly show a "mode" button or feature 24g on display screen 24, which allows the user to select between a "default activate mode" and a "default non-activate mode", and which displays which mode is currently operational. The first or "default activate mode" is discussed above in connection with method 110 of FIG. 8.

In a second or "default non-activate mode", when microphone 34 of smart device 20 detects a new sound pattern, it is digitized at A/D converter 36, delivered to processor 30, which operates with memory 32 to categorize the sound pattern, e.g., into a "voice" pattern, a "music" pattern, a "fan" pattern, etc. Processor 30 causes memory 32 to record a sample of the new sound pattern and a corresponding new icon to be displayed on display screen 24, but does not allow the sound pattern to be delivered initially via transmitter/receiver 38, 56 or transceiver/transceiver 38, 56 to earpiece(s) 50. In an embodiment, processor 30 of smart device 20 also causes the new icon to flash temporarily and/or a vibrator (not illustrated) within smart device 20 to provide haptic feedback temporarily, which lets the user know that a new sound has been detected.

When the user presses the newly displayed icon, processor 30 recalls the sound pattern sample from memory 32 and allows the sound pattern sample to be delivered via transmitter/receiver 38, 56 or transceiver/transceiver 38, 56 to earpiece(s) 50 and displays an "activate" button and possibly a "deactivate" button on display screen 24. If the user presses the "activate" button, processor 30 thereafter causes the sound pattern to be delivered to earpiece(s) 50 and shows the corresponding icon as being activated (e.g., highlights or changes the icon from X'd-out, grayed-out or darkened to normal). If the user instead (i) presses the "deactivate" button if provided, or (ii) does not press the "activate" button within a certain time period if the "deactivate" button is not provided, processor 30 continues to prevent the sound pattern from thereafter being delivered to earpiece(s) 50 and continues to show the corresponding icon as being deactivated (e.g., grayed-out or darkened). In an embodiment, processor 30 is configured to allow the user to press any X'd-out, grayed-out or deactivated icon at any time, including repetitively to hear the sound pattern sample multiple times, to decide whether to activate the sound pattern. As with the "default activate mode", processor 30 and memory 32 allow the user in "default activate mode" to toggle back and forth between activation and deactivation as many times as desired.

Figure 9:
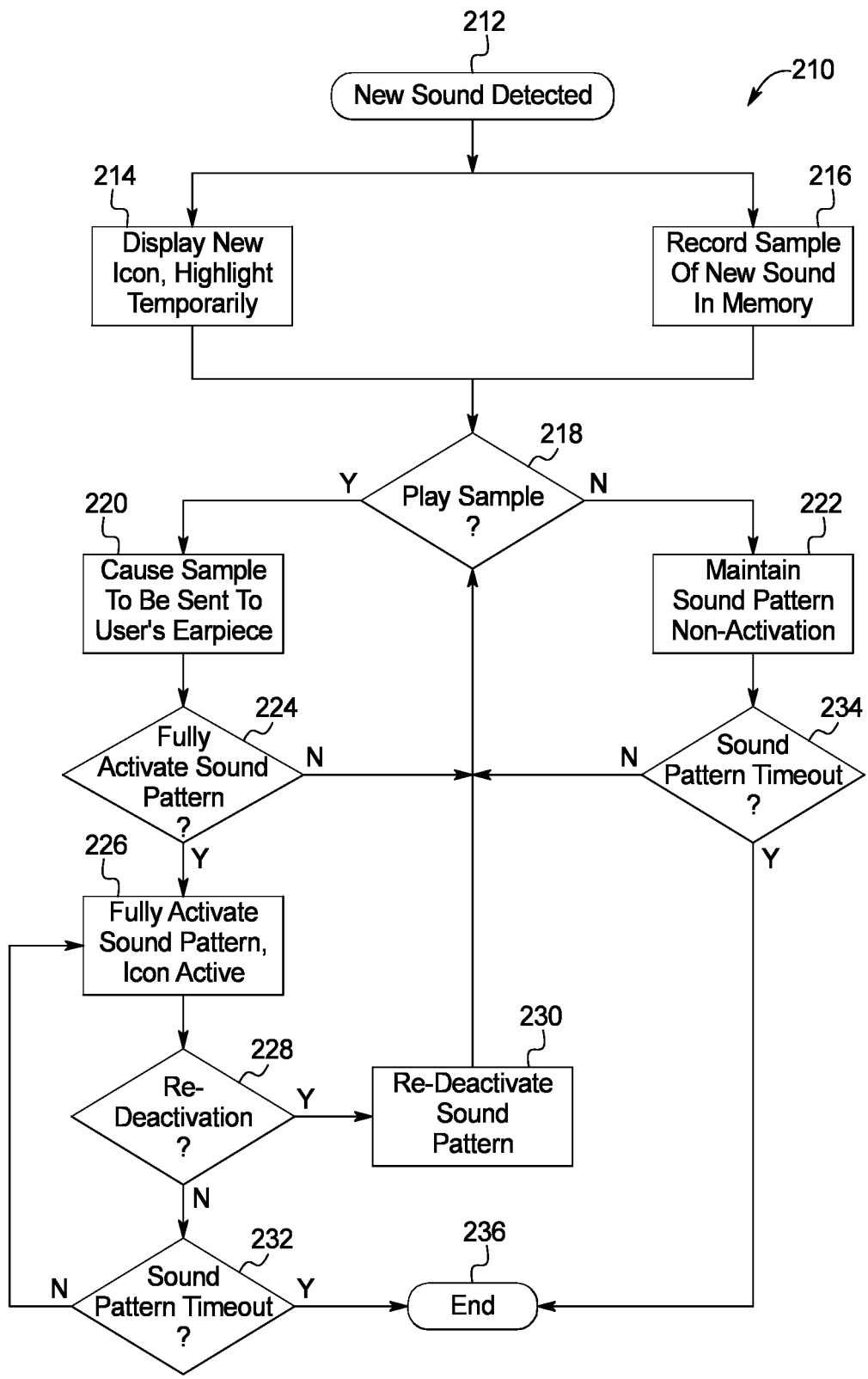
FIG. 9 is a schematic flowchart illustrating another embodiment of the present disclosure, wherein incoming sound patterns are initially not activated, and which allows the user to activate the sound patterns if desired.

The second mode just described is illustrated in a flowchart manner in FIG. 9 via method 210. At oval 212, a new sound pattern is detected and method 210 begins. At blocks 214 and 216, respectively, processor 30 of smart device 20 causes (i) a new icon to be displayed and highlighted temporarily (e.g., via visual and/or haptic feedback to the user) before being grayed-out, darkened or X'd-out and (ii) a sample of the sound pattern to be stored in memory. The sound pattern is not delivered initially to and played by earpiece(s) 50. At diamond 218, the user is able to select to activate the sound pattern sample by pressing its corresponding icon. If the user presses the corresponding icon at diamond 218, the sound pattern sample is delivered to and played by earpiece(s) 50, as indicated by block 220. If the user does not press the corresponding icon at diamond 118, processor 30 continues to not deliver the sound pattern sample to earpiece(s) 50, as indicated by block 222, and continues to display the icon in a grayed-out, darkened or X'd-out format, indicating that the particular sound pattern is deactivated. Block 222 leads back to the play sample query at diamond 118, indicating that the user may cause the sound pattern sample to be played at anytime while the sound pattern is deactivated.

After the sound pattern sample is delivered to and played by earpiece(s) 50 at block 220, processor 30 at diamond 224 allows the user to fully activate the sound if desired. In various examples, processor 30 may cause "activate" and "deactivate" buttons to be displayed on display screen 24. Or, processor 30 may cause only an "activate" button to be displayed on display screen 24, but which times out if the user does not press the button (e.g., after five seconds and/or settable under the settings option). If the user decides to fully activate the sound pattern at diamond 224, processor 30 at block 226 causes the sound pattern to be delivered to earpiece(s) 50 anytime it is sensed at microphone 36 and shows the corresponding icon as being activated (e.g., highlights or changes the icon from X'd-out, grayed-out or darkened to normal), indicating that the sound pattern is currently activated. If the user does not decide to fully activate the sound pattern at diamond 224, processor 30 causes method 210 to return to the play sample query at block 218. In this manner, the user may listen to the sound pattern sample multiple times before deciding to fully activate the sound pattern or not.

At diamond 228, processor 30 enables the user to re-deactivate the activated sound pattern if desired. In various examples, processor 30 may cause "activate" and "deactivate" buttons to be displayed again on display screen 24. Or, processor 30 may cause only a "deactivate" button to be displayed on display screen 24, but which times out if the user does not press the button (e.g., after five seconds and/or settable under the settings option). If the user decides to re-deactivate the sound pattern at diamond 228, processor 30 at block 230 causes the sound pattern to not be delivered to earpiece(s) 50 if it is sensed at microphone 36 and shows the corresponding icon as being deactivated (e.g., changes the icon to being X'd-out, grayed-out or darkened), indicating that the sound pattern is currently deactivated. If the user does not decide to re-deactivate the sound pattern at diamond 228, processor 30 causes method 210 to return to sound pattern delivered block 226. In this manner, the user may re-deactivate a sound at anytime while it is currently activated.

As with method 110 in FIG. 8, method 220 in FIG. 9 includes two primary decision loops, namely, (i) between deactivation block 222 and play sound pattern sample query at diamond 218 and (ii) between re-deactivation query at diamond 228 play sound pattern block 226. Those loops each include a timeout determination, namely, at timeout determination diamonds 232 and 234. It should again be appreciated that processor 30 and memory 32 of earpiece(s) 50 perform method 210 for each detected sound pattern icon displayed on display screen 24. In an attempt to declutter display screen 24, if within a set period of time at diamonds 232 and 234, e.g., a user selectable time period, the existing sound pattern is detected at microphone 34, the loops discussed above are allowed to continue. But if after the set period of time at diamonds 232 and 234, the existing sound pattern is not detected at microphone 34, then the corresponding icon is removed from display screen 24 and method 210 for that particular sound pattern ends as indicated oval 236.

Any timed-out and removed sound pattern will reappear as a grayed-out, darkened or X-d out icon if the sound pattern reappears after timing-out (e.g., television or movie actor not seen since the beginning of the show reappears). It is again contemplated that the timeout feature for method 210 be user selectable so that the user can turn the timeout feature off if desired. Alternatively or additionally to the timeout feature just described, it is again contemplated to provide with method 210 a "reset" button or feature 24f on display screen 24 of smart device as illustrated in FIGS. 5 to 7, which allows the user to cause processor 30 to remove all sound icons from display screen 24 and to start over.

Figure 10:
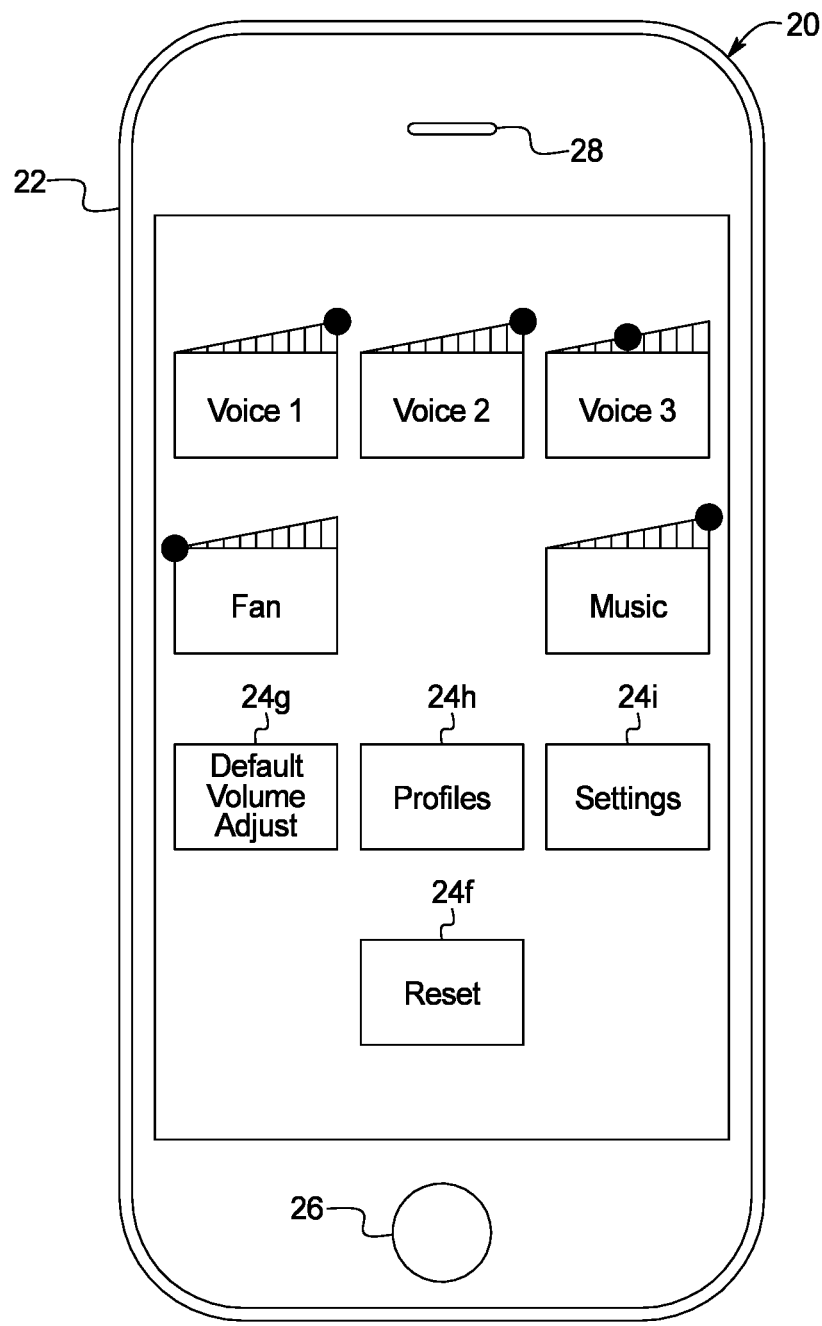
FIG. 10 is an elevation view of a further embodiment of a screen of a user's smart device having the software application of the present disclosure, wherein incoming sound patterns are volume adjustable by the user.

Methods 110 and 210 of FIGS. 8 and 9, respectively, either activate or deactivate a given sound pattern. As discussed herein, audio-up adjuster 40a and audio-down adjuster 40b operate with processor 30 and/or possibly with a separate sound card or controller to collectively adjust the volume of all activated sound patterns. FIG. 10 illustrates a further alternative structure and functionality. Here, each sound pattern icon 24a to 24e is provided with an adjustable slider or sliding mechanism 24z, which allows the user to adjust any given sound pattern anywhere from zero percent (sound pattern not delivered) to one-hundred percent (sound pattern delivered at maximum volume). In the example used throughout the specification, the user instead of wanting to deactivate the voice of the family member speaking on the telephone completely, may desire the voice to be lowered, e.g., to fifty percent of maximum as illustrated in FIG. 10, while keeping the television or movie voices and music at the maximum or one-hundred percent setting and the dehumidifier noise at a minimum or zero percent setting. In this way, the user can be comforted in knowing that the family member is in the room, while focusing the audio output to earpiece(s) 50 on the television or movie.

In various embodiments, the "volume adjust mode" of FIG. 10 may be provided alone (without methods 110 and 210 of FIGS. 8 and 9) or in combination with one or both of methods 110 and 210, e.g., as a mode option selectable via "mode" button or feature 24g. The maximum volume for each sound pattern icon 24a to 24e may be set under the settings option, set via audio-up adjuster 40a and audio-down adjuster 40b, or default to the maximum possible volume for smart device 20 and therefore not use or be effected by audio-up adjuster 40a or audio-down adjuster 40b. The system and method of FIG. 10 may also employ the "timeout" and "reset" features discussed above for methods 110 and 210.

Figure 11:
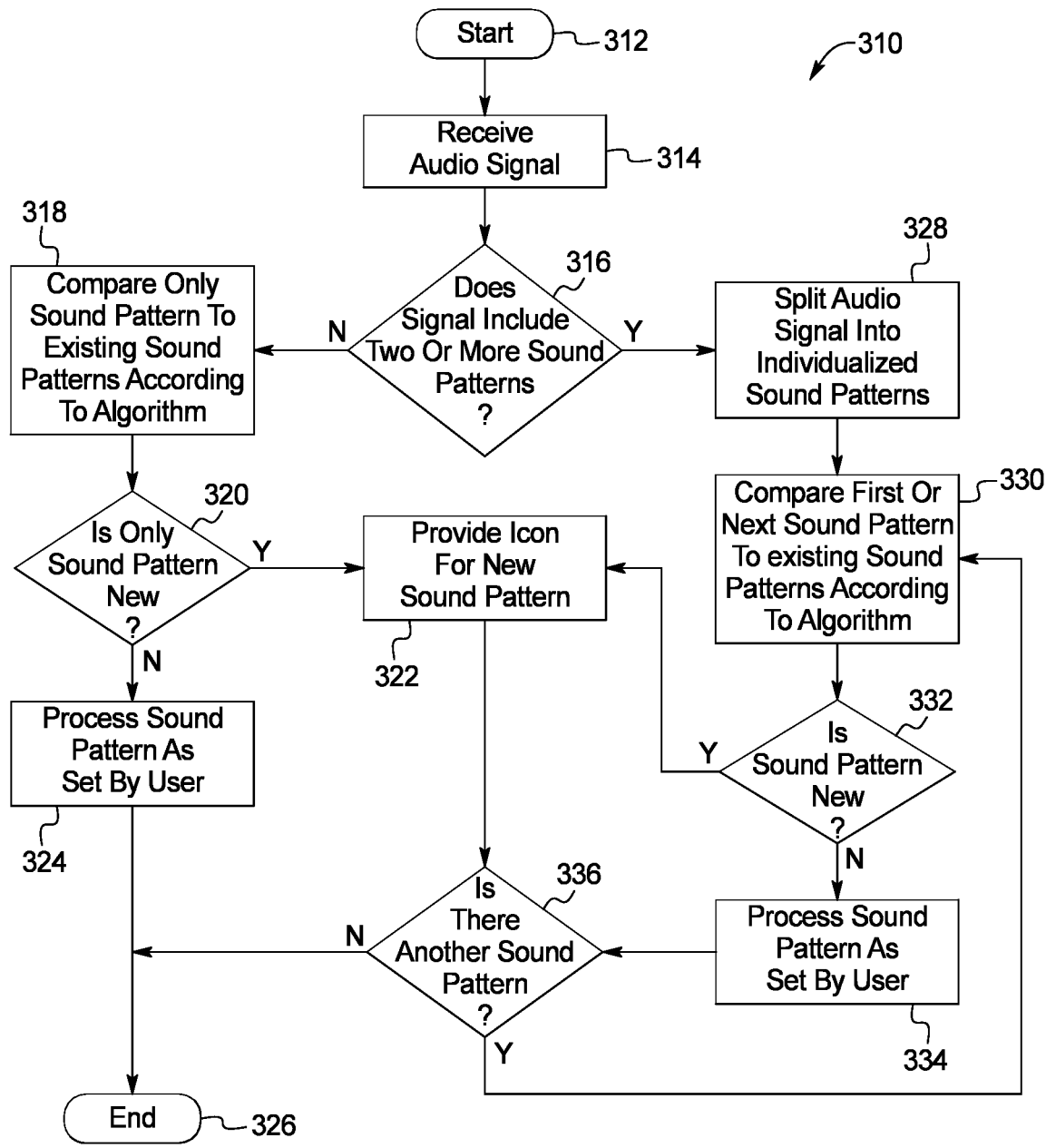
FIG. 11 is a schematic flowchart illustrating one embodiment of the present disclosure for sound pattern recognition and determining if an incoming sound pattern is new or existing.

Methods 110, 210 and the methodology associated with FIG. 10 each involve what happens when a sound pattern is deemed to be new. In many instances however, a sound pattern derived from an incoming audio signal has already been activated or deactivated by the user. In such a case, processor 30 recognizes that the sound pattern is not new and processes the sound pattern according to the user's designation, e.g., allows the sound pattern to be delivered to earpiece(s) 50 or not. Method 310 of FIG. 11 illustrates one embodiment for both splitting an incoming audio signal into individualized sound patterns and determining if the individualized sound patterns are new or not. At oval 312, method 310 begins.

At block 314, processor 30 receives an audio signal from microphone 34. The audio signal potentially including multiple sound patterns may be digitized via A/D converter 36 or electronics may be provided to separate the analog signal into discrete analog sound patterns, which are each individually digitized via A/D converter 36 and sent to processor 30. In either case, at diamond 316 it is determined whether the incoming audio signal contains two or more discrete sound patterns. If not, and only a single sound pattern is incoming, then processor 30 at block 318 compares the only incoming sound pattern to all existing sound patterns (activated and non-activated) to determine if the sole sound pattern is new using a comparison algorithm discussed below.

If the incoming sound pattern is new as determined at diamond 320, then processor 30 at block 322 causes a new icon for the new sound pattern to be displayed on display screen 24. The user may then activate or deactivate the sound pattern represented by the newly displayed icon in any of the manners described above. If the incoming sound pattern is not new as determined at diamond 320, then the sound pattern at block 324 is handled as previously set by the user, after which method 310 ends at oval 326.

If at diamond 316 it is determined that the incoming audio signal contains two or more discrete sound patterns, then at block 328 the audio signal is split into the two or more individualized sound patterns. In an embodiment, the same comparison algorithm used in connection with block 318 is used to discern between the two or more individualized sound patterns at block 328.

The same comparison algorithm is used again in one embodiment at block 330 to examine a first one of the individualized sound patterns, which is compared against all existing sound patterns (activated and non-activated) to determine if the first sound pattern is new using a comparison algorithm discussed below. If the first sound pattern is new as determined at diamond 332, then processor 30 at block 322 causes a new icon for the new sound pattern to be displayed on display screen 24. The user may then activate or deactivate the sound pattern represented by the newly displayed icon in any of the manners described above. If the incoming sound pattern is not new as determined at diamond 332, then the sound pattern at block 334 is handled as previously set by the user.

After new icon block 322 and after the not new action block 334, method 310 at diamond 336 determines if another individualized sound pattern exists. If so, then method 310 returns to comparison block 330 and the comparison analysis just described for the first individualized sound pattern is repeated for the next individualized sound pattern. If another individualized sound pattern does not exist as determined at diamond 336, that is, each of the individualized sound patterns separated from the incoming audio signal at block 328 has been analyzed at blocks or diamonds 330, 332 and 334 or 322, then method 310 ends as indicated by oval 324.

As discussed above, a comparison algorithm is used at block 318, block 328 and block 330 described above to differentiate between multiple sound patterns being introduced via an incoming audio signal and to compare new sound patterns to existing sound patterns. FIGS. 2A to 4B illustrate how different sound patterns have different amplitude levels, different amplitude ranges, different frequency levels and different frequency ranges. The comparison algorithm may take into account any one, or more, or all of these differentiators, including derivatives thereof. In an embodiment, the software is able to discern between different sound patterns by taking into consideration at least one of: (i) an average frequency and/or range of frequencies of a particular sound pattern identified as a voice pattern, (ii) an average amplitude and/or range of amplitudes of the particular vice pattern, (iii) a reflection or accent theme of the particular sound pattern (e.g., look for repetitive and consistent changes in amplitude and/or frequency, such as a repetitive sharp burst of sound being categorized as a dog barking). The software application in an embodiment is configured to look a first differentiator of (i), (ii) or (iii) to differentiate between two or more patterns deemed to be voice patterns. If the first differentiator is not capable of differentiating between the voice patterns, the software application looks to a second differentiator of (i), (ii) or (iii) to differentiate between two or more patterns. If the first and second differentiators are not capable of differentiating between the voice patterns, the software application looks to a third differentiator of (i), (ii) or (iii) to differentiate between two or more patterns. If the software application is unable to detect between two or more patterns after looking at all differentiators, the software deems the two or more patterns to be a single pattern and displays a single icon for same. The icon in an embodiment indicates to the user that the icon may represent one or more sound pattern.

The above algorithm employed in the software of system 10 may be used to perform at least three tasks, including (i) differentiating between distinct sound patterns of an incoming audio signal, (ii) determining if the distinct sound patterns are new or existing, and (iii) categorizing new sound patterns for the display of a corresponding icon on display screen 24 of smart device 20.

Figure 12:
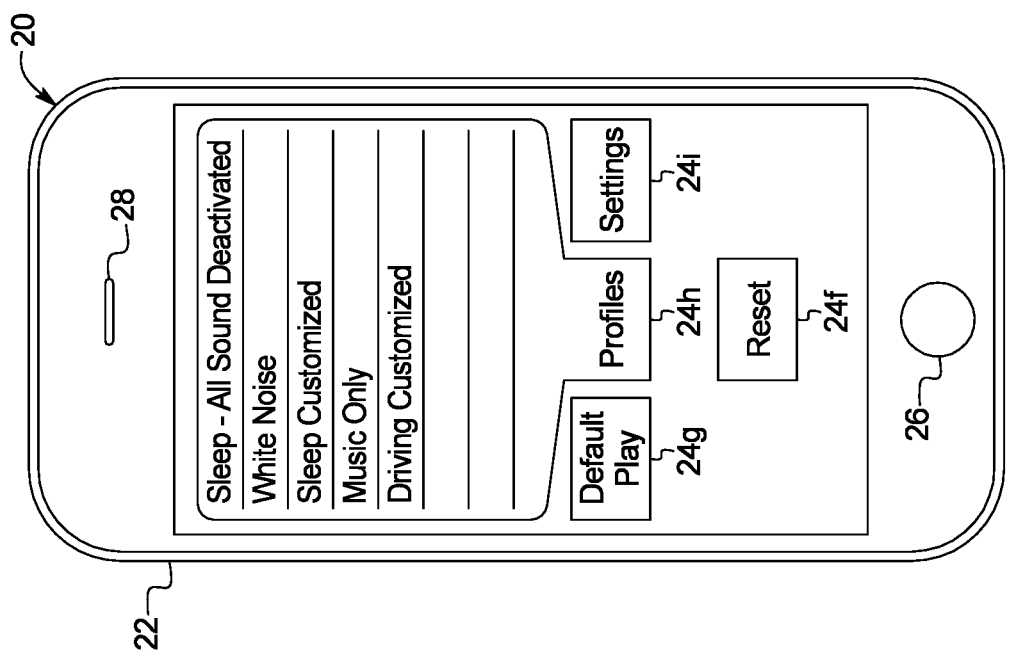
FIG. 12 is an elevation view of a screen of a user's smart device illustrating one embodiment for a profile feature of the present disclosure.

FIGS. 5 to 7 and 10 illustrate that in an embodiment, the software application via processor 30 and memory 32 provides a "profile" button or feature 24h. Profile button or feature 24h enables a single user selection to activate and deactivate predetermined sound patterns to achieve a desired objective. The profile may be preinstalled in the software application and/or be customized by the user in the display screen of FIG. 12. FIG. 12 illustrates display screen 24 after the user has selected "profile" button or feature 24h in one of FIG. 5 to 7 or 10. FIG. 12 illustrates a selectable "sleep" profile, which may be a preinstalled profile for which all incoming sound patterns are automatically deactivated. FIG. 12 also illustrates a second preinstalled selectable sleep type of profile, which may be called "white noise" for which all incoming sound patterns except for a fan or white noise type of sound pattern are automatically deactivated (e.g., the settings of FIG. 7). A customizable and selectable sleep pattern in another example allows the user to add the sound of their dog barking to the original "sleep" profile, which otherwise automatically deactivates all other sound patterns.

FIG. 12 also illustrates a selectable "music only" profile, which may be preinstalled or user added, and in which the software application automatically deactivates all sound patterns deemed not to be a musical pattern. FIG. 12 further illustrates a "driving" profile, which may be preinstalled or user added, and in which the software application automatically deactivates all sound patterns deemed to be musical patterns and activates all other incoming sound patterns, so that the user may hear external noises and any voices in the automobile that may issue warnings. Of course, the user may deactivate any voices deemed to be unhelpful, such as that of a baby or small child. In an embodiment, the application lets the user build as many sound pattern profiles as desired.

Figure 13:
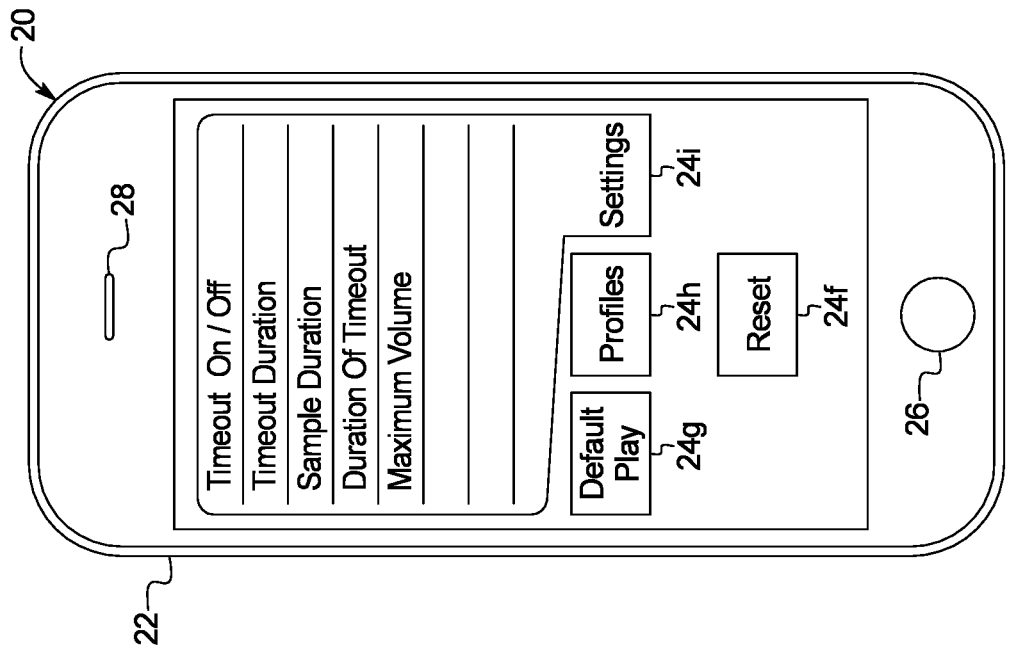
FIG. 13 is an elevation view of a screen of a user's smart device illustrating one embodiment for a settings option of the present disclosure.

FIGS. 5 to 7 and 10 illustrate that in an embodiment, the application via processor 30 and memory 32 provides a "settings" button or option 24i. Settings button or option 24i enables the user to program and customize the structure and functionality for the software application of system 10 described herein. FIG. 13 illustrates display screen 24 after the user has selected the "settings" button or feature 24i in one of FIG. 5 to 7 or 10. FIG. 13 illustrates a settings dropdown menu that enables the user to select a feature to program or optimize. In the illustrated embodiment, the features to program or optimize include (i) a "timeout on/off" feature that allows the user to either implement or not implement the timeout feature discussed above, wherein a default setting for the timeout feature is "on", (ii) a "timeout duration" feature that allows the user to set a time period or duration during which if no sound for an existing sound pattern icon is detected, the icon is removed from display screen 24, wherein a default setting is for example, fifteen minutes, (iii) a "sample duration" feature that allows the user to set a time period or duration over which processor 30 and memory 32 will record a sound pattern sample as discussed in connection with method 210 of FIG. 9, (iv) a duration of a timeout after displaying activate and/or deactivate buttons if no respective deactivate and activate buttons are provided in connection with method 210, wherein a default may be five seconds, and/or (v) a "maximum volume" feature that allows the user to set the maximum volume for the system and methodology described in connection with FIG. 10.

Figure 14:
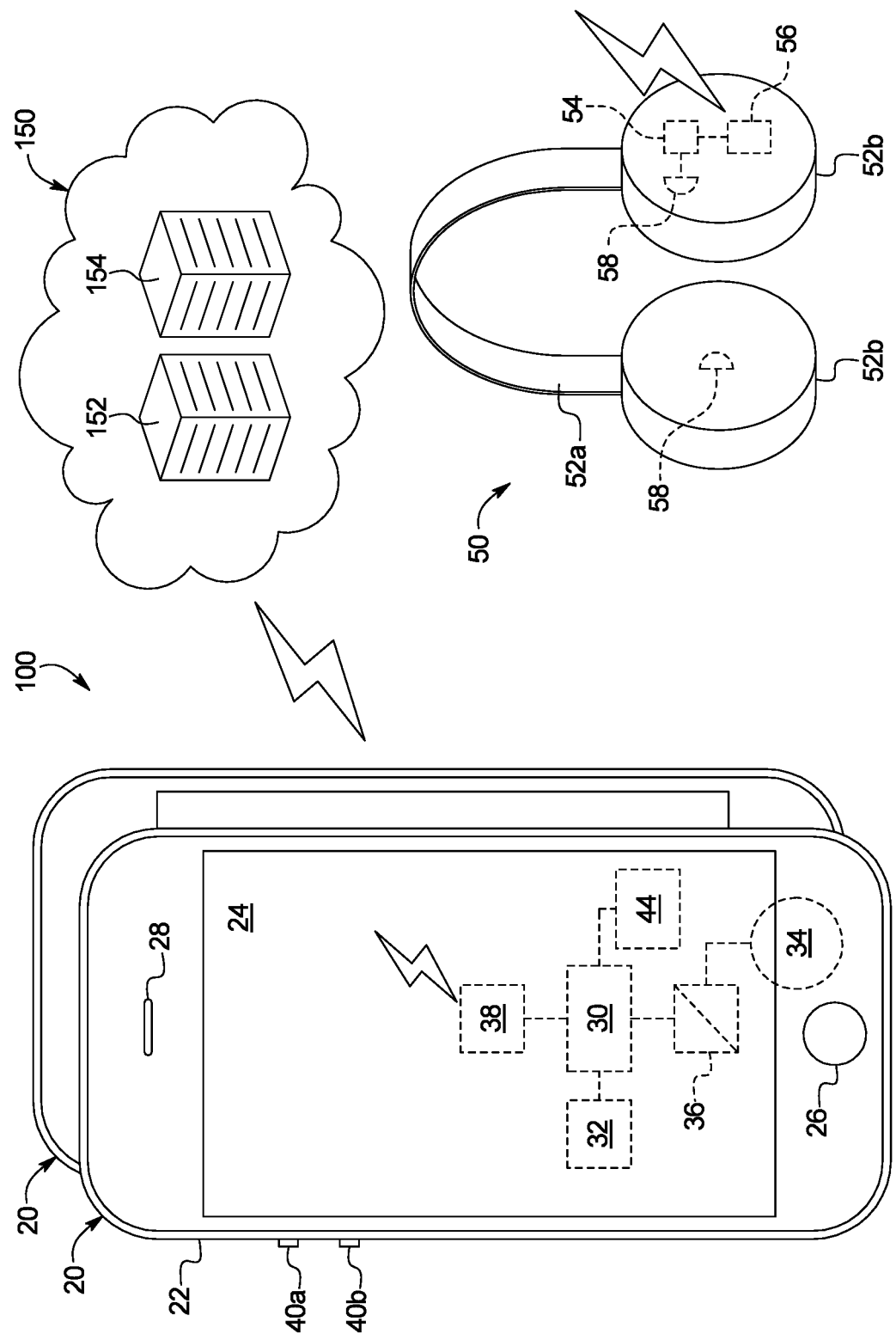
FIG. 14 is a perspective view of one embodiment of another system of the present disclosure illustrating a user's smart device used in combination with the user's earpiece and a cloud server.

Referring now to FIG. 14, an alternative embodiment for a hearing impairment or improvement system is illustrated by system 100. System 100 includes each of the structure, functionality and alternatives discussed above in connection with system 10, including smart device 20 having housing 22, display screen 24 (with touch screen overlay), input device 26, processor 30, memory device 32, at least one microphone 34, analog to digital (A/D) converter 36, transceiver 38, audio-up adjuster 40a and audio-down adjuster 40b. While microphone 34 is illustrated as being integrated within smart device in both systems 10 and 100, it should be appreciated that microphone 34 could be an external microphone, the output of which is connected wired or wirelessly to smart device 20. For example, microphone 34 may be an external surveillance microphone, e.g., hidden in a remote dwelling that outputs wired or wirelessly to smart device 20.

System 100 also includes earpiece 50, here illustrated as headphones. Headphones 50 include a housing having head strap 52a extending between ear covering and sound receiving/playing portions. Housing 52a/52b houses sound processing electronics 54, wireless receiver or transceiver 56 and speakers 58. While sound processing electronics 54 are illustrated as being located within housing 52a/52b in both systems 10 and 100, it should be appreciated that sound processing electronics 54 and its functionality may be located instead within smart device 20. Here, earpiece or headphones 50 contain only the electronics needed to receive and broadcast sound to the user.

System 100 in FIG. 14 also includes a cloud server 150. As mentioned above, the software application may be browser- or cloud-based, a local application or a hybrid of same. Cloud server 150 in the illustrated embodiment includes one or more cloud-based processor 152 and one or more cloud-based memory 154. Processor 152 can run the software application if stored at memory 154. Memory 154 may also store a sound pattern database discussed below. Cloud server 150 is configured to communicate wirelessly with many, many smart devices 20.

One primary difference between system 10 and system 100 is that system 100 provides advanced sound pattern identification over system 10. In system 10, which is primarily for users having hearing impairment, the user may not care what kind of music belongs to a musical sound pattern, just that the music belongs to a television show and is therefore desirable. Or, the music may belong to a nearby person's audio player and therefore not be desirable. System 100 allows the user to preselect a particular sound pattern within a sound pattern group or a particular sound pattern category within a plurality of sound pattern categories, for the system to attempt to identify such sound pattern or category, and for the system to then play the selected sound pattern or category if identified. Here, the user is likely not dealing with hearing impairment but instead may have good or adequate hearing but wants to hear if a particular sound is being generated.

System 100 stores a sound database at memory device 32 of smart device 20, at memory 154 of cloud server 150, or at both memory devices either in duplicate, split between the two memory devices 32 and 154, or where for example the cloud server sound database is more robust than the smart device sound database. Depending upon which database deployment is chosen, memory device 32 of smart device 20, and/or memory 154 of cloud server 150 may store a software algorithm for interrogating the respective database. The software algorithm may be part of the software application of smart device 20 discussed above, for example. The algorithms may compare stored combinations of one or more frequencies (f) and/or one or more loudness levels (Decibels ("dB") to store sound files having stored one or more frequency and/or stored one or more loudness level. Other sound attributes that may be compared include any one or more of sound pattern pitch, sound pattern pause, sound pattern reflection and/or sound pattern direction.

In an embodiment, the sound files have stored combinations of frequencies and loudness levels, which makes identification of specific types of sound patterns possible. A good example is a birdcall. A first type of bird may have a sound file pattern f1dB3, f1dB3, f1dB3, f4dB5, f4dB5, f4dB5, f4dB5, f4dB5, while a second type of bird may have a sound pattern f2dB4, f5, dB3, f2dB4, f5, dB3, f2dB4, f5, dB3, f2dB4, f5, dB3. It is contemplated for the user to operate system 100 in at least two ways. In a first way, the user informs system 100 that the user only wants to hear sound patterns matching the first type of birdcall. Here, there may be a slight delay between when the sound pattern is received at microphone 34 and when the sound pattern reaches earpiece or headphones 50 to allow system 100 time to receive the sound pattern and determine if the sound pattern matches the selected sound pattern.

In a second way, system 100 identifies the sound patterns played for the user. Suppose the user selects to play all bird sound patterns. When the first birdcall is received at microphone 34, system 100 plays the first birdcall at earpiece or headphones 50 and identifies the first bird on display screen 24. When the second birdcall is received at microphone 34, system 100 plays the second birdcall at earpiece or headphones 50 and identifies the second bird on display screen 24. If microphone 34 receives birdcalls of both the first and second birds in some overlapping manner, system 100 plays the first and second birdcalls in the overlapping manner at earpiece or headphones 50 and identifies the first and second birds on display screen 24 in the same overlapping manner, e.g., first birdcall only, followed by first and second birdcalls, followed by second birdcall only.

Figure 15:
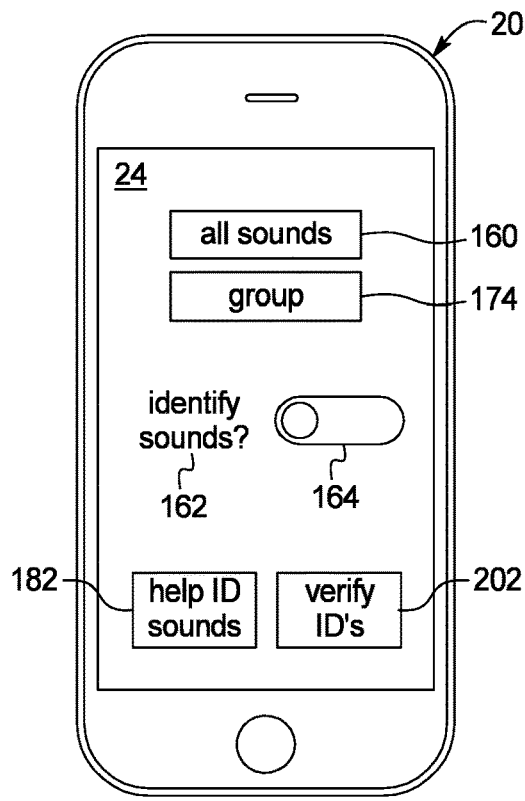
FIG. 15 is an elevation view of a screen of a user's smart device illustrating one embodiment for an initial identify sounds screen of the system of FIG. 14.

FIG. 15 illustrates an embodiment of the user interface for system 100, which is displayed on display screen 24 of smart device 20. The user interface displays a box 160, which defaults to "all sounds" as illustrated. The user interface also displays an "identify sounds" option 162 next to a selector or swipe on/off icon 164. If the user swipes the "identify sounds" option 162 to "on", system 100 causes display screen 24 to identify and list the sound patterns as they are played at earpiece or headphones 50.

Figure 16:
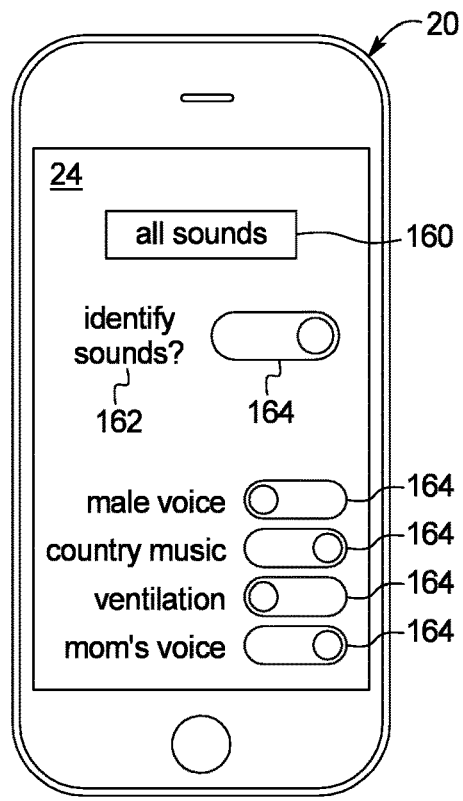
FIG. 16 is an elevation view of a screen of a user's smart device illustrating one embodiment for a second identify sounds screen of the system of FIG. 14.

FIG. 16 illustrates an example of when the user selects "all sounds" at box 160 (e.g., "all sounds" automatically played as a default unless changed as discussed below) and swipes "identify sounds" option 162 at selector or on/off icon 164 to "on". In the example, four sound patterns have been identified and listed on display screen 24, namely, "male voice", "ventilation", "country music", and "mom's voice". An on/off icon 164 is displayed next to each listed sound pattern. In the illustrated embodiment, the user has turned off the "male voice" and "ventilation", but has chosen to listen to "country music" and "mom's voice". The one or more software algorithm of system 100 is able to (i) discern between country music and other types of music and (ii) allow the user to make customized sound pattern identities, such as "dad's voice", "Pete's voice, etc.

In an embodiment, sound pattern identities customized by the user are stored at the sound database of local memory device 32, while general sound patterns, such as "ventilation" and "country music", may be stored at the browser-based database of cloud memory 154. For example, it may be preferable that personal sound patterns are stored at local memory device 32, but could alternatively be stored at the browser-based database of cloud memory 154, e.g., to synchronize the user's personal sound patterns to the cloud so that they may be accessed by different user devices 20.

Alternatively or additionally, the sound patterns most frequently used or requested by the user are stored at the sound database of local memory device 32, while the general sound patterns are stored at the browser-based database of cloud memory. It should be appreciated however that the user may have his or her own dedicated portion of the browser-based database of cloud memory 154 to store customized sound patterns, while general sound patterns may be stored alternatively or additionally at the sound database of local memory device 32. It should also be appreciated that the application software of both systems 10 and 100 may be stored at the cloud server and accessed by the user when connected to the internet, but also be downloadable to the user's smart device 20, for example, when the user knows that internet will not be available, e.g., while camping, on vacation, or on a long drive. Any one or more or all sound pattern stored at the browser-based database of cloud memory 154 may also be downloaded to the user's smart device 20 for the same reason.

If the user at FIG. 16 selects "all sounds" at box 160 but elects to maintain "identify sounds" option 162 at on/off icon 164 at "off", system 100 will play all sound patterns at earpiece or headphones 50 but will not list the sound patterns on display screen 24. Here, the user does not have the option of filtering or turning off any of the incoming sound patterns.

Figure 17:
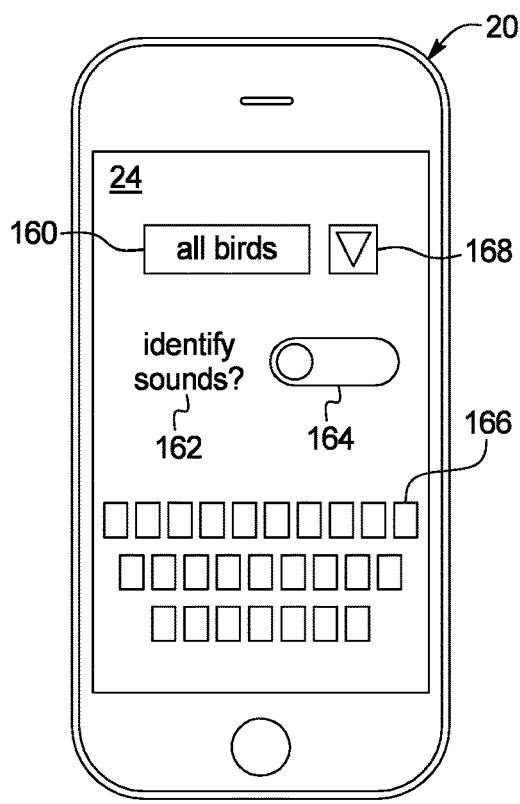
FIG. 17 is an elevation view of a screen of a user's smart device illustrating one embodiment for allowing a user to narrow the amount of sound patterns that the system of FIG. 14 will play for the user.

FIG. 17 illustrates that when the user touches or taps box 160, for example, "all sounds" is removed from box 160 and a keyboard 166 appears at the bottom of display screen 24, which enables the user to narrow "all sounds" down to a selected category of sound patterns. The user keys a desired category into box 160 via keyboard 166, such as "birds", which is illustrated in FIG. 17 as "all birds". The user may then press "all birds" at box 160, after which system 100 will play any and all bird sound patterns or calls at earpiece or headphones 50. If the user selects the "identify sounds" option 162 by swiping on/off icon 164 to "on", system 100 will attempt to name each of the bird making sound patterns detected by microphone 34 on display screen 24. The user may then deactivate or keep activated each identified bird using on/off icon 164 displayed next to each listing as discussed above.

FIG. 17 also illustrates a dropdown arrow 168, which appears next to box 160 when the user selects a sound pattern category, such as birds, and if there exists at least one subcategory beneath the selected category. That is, if there is currently no subcategories under "all birds", then no dropdown arrow appears.

Figure 18:
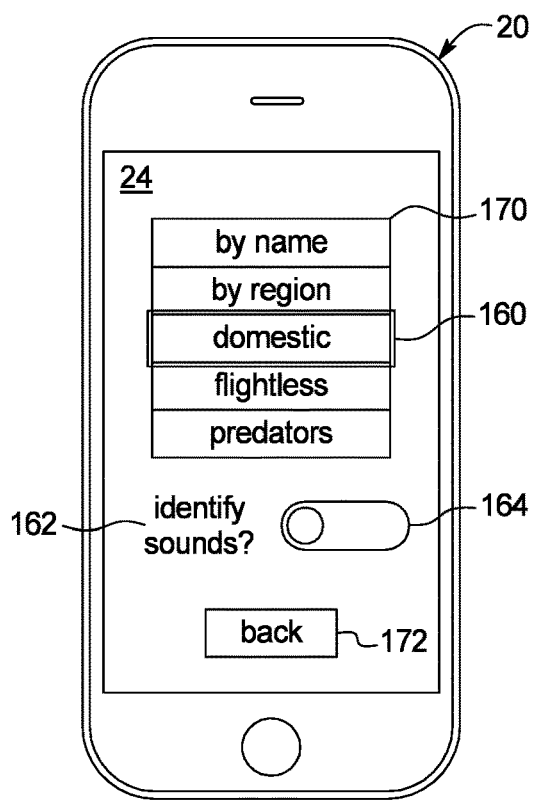
FIG. 18 is an elevation view of a screen of a user's smart device illustrating one embodiment for providing a drop-down menu for further narrowing the amount of sound patterns that the system of FIG. 14 will play for the user.

FIG. 18 illustrates that after the user touches or taps the dropdown arrow 168 in FIG. 17, each subcategory under "all birds" is illustrated. Because the number of subcategories may be large, the subcategories may be displayed in the form of a rotatable and user swipeable wheel 170, wherein a highlighted one of the subcategories appears in selection box 160. The subcategories may be ordered alphabetically, numerically, or alphanumerically, for example. In the illustrated embodiment of FIG. 18, the displayed subcategories for "all birds" includes, "by name", "by region", "domestic", "flightless", "predators". When a desired one of those subcategories is displayed in selection box 160, the user presses box 160 after which display screen 24 no longer displays the remaining subcategories.

As indicated by the labels of most of the subcategories, e.g., "by name", "by region", "domestic", "flightless", "predators", certain subcategories will have sub-subcategories, which may in turn have sub-sub-subcategories, and so on. If any of the subcategories having sub-subcategories is selected by the user, dropdown arrow 168 reappears next to selection box 160 and the process described above including swipeable wheel 170 is repeated. The "identify sounds" option 162 operated by swiping on/off icon 164, and the associated activation or deactivation of any identified and displayed sound, applies to any selection at box 160, at any category or subcategory level. Moreover, any category or subcategory not having a further subcategory once selected, e.g., a specific species of bird, will appear in selection box 160, but dropdown arrow 168 will not appear.

Each time the user drills down into a narrower subcategory, the possible number of sound patterns detected by microphone 34 that will be played at earpiece or headphones 50 is narrowed. FIG. 18 further illustrates that a "back" button 172 is provided to enable the user to back up to any previous level. In one embodiment, the sound pattern identities of the sound database(s) stored at memory device 32 of smart device 20 and/or at memory 154 of cloud server 150 are structured and ordered the same as the categories, subcategories, sub-subcategories, etc., just discussed and displayed at display device 24, which streamlines the transformation of information from the database(s) to display device 24 of smart device 20.

System 100 does not require the user to begin at the broadest subcategory. The user may instead begin at any sub-subcategory (or sub-sub-sub, etc.) level. The processor running the software of system 100 attempts to match the user's requested category as best as possible. If for example the user types in "Canadian birds" into keyboard 166, but the category stored in the sound database is instead "birds of Canada", system 100 will determine "birds of Canada" to be the best match to the user's request and display same at display device 24. If no category relating "birds" and "Canada" is stored in the sound database, the processor running the software of system 100 will look to see if the word "Canada" is found in a list of words or metadata associated with an existing bird category. And if, for example, the software stores the word "Canada" in a list of words or metadata associated with the existing subcategory, "by region" under the category "all birds", then system 100 causes the subcategory "by region" to be displayed at selection box 160. From here, the user may search for the region most closely matching that of Canada.

It should be appreciated that system 100 enables the user to listen for very specific sound patterns and to automatically exclude all other sound patterns. System 100 is accordingly very useful for surveillance purposes, where incoming sound patterns may be filtered for a specific voice, type of voice or language. System 100 is also very useful for diagnostic purposes, where incoming sound patterns may be filtered to search for a particular sound, indicating mechanical or operational failure. System 100 may also be very useful for military purposes, where incoming sound patterns may be filtered to search for a particular gunfire sound, indicating enemy presence.

It is contemplated to enable the application software of both systems 10 and 100 to be operated on smart device 20, while the smart device plays audio from another application or streams audio from an internet website. FIG. 19 illustrates schematically the software 156 of system 10 or 100 (e.g., stored device memory 30 or at server memory 154) operating simultaneously on smart device 20, while a music application or a website stream 158 generates musical sound patterns at earpiece or headphones 50. In an example, system 100 may be set to limit incoming sound patterns to that of a desired voice, such as a parent's vice, or to a doorbell, while the user otherwise listens to music. If microphone 34 detects the parent's voice or the doorbell, the associated sound patterns are played simultaneously at earpiece or headphones 50, interrupting the concurrently played music.

It is also contemplated for any of the embodiments of system 10 or 100 to provide a "nap" mode, e.g., on a plane, train or bus in which the system 100 listens for key words, such as "captain", seat back", "tray table", "next stop", "emergency", etc. System 10 or 100 blocks out all other sound patterns except for those having any of the key words. The keywords may be preset in a "plane nap", "train nap" or "bus nap" profile and/or be user enterable. In an embodiment, systems 10 and 100 record the incoming sound patterns. Once a keyword is detected, system 10 or 100 causes the entire corresponding sound pattern to be played at earpiece or headphone 50. That is, even the portion of the sound pattern prior to the keyword is caused to be played at earpiece or headphone 50. The sound pattern may accordingly be slightly delayed from real time, however, sound patterns important to the user are nevertheless delivered to the user.

System 100 as illustrated in FIG. 14 includes a cloud server 150, and as discussed, the operating software and databases of system 100 may be located at memory device 32 of smart device 20 and/or at memory 154 of server 150. It is contemplated for system 100 to provide a platform or sandbox for different groups of users to build proprietary sound databases. Keeping with the bird example, server 150 allows a group of bird enthusiasts, for example, to build a database of birdcall sound patterns, which in one embodiment is username and password protected.

FIG. 15 illustrates that display screen 24 of smart device 20 may display a "group" selection button 174, which when pressed takes the user to a screen displayed at FIG. 20 having a username entry box 176, a password entry box 178 and keyboard 166, which the user uses to enter the username and password into the respective boxes. In an embodiment, the username identifies the group, while the password confirms the user's membership in the group. System 100 may provide a second level of security, wherein upon entry of the username and password, system 100 sends a code to the user, e.g., via short message service ("SMS") or multimedia messaging service (MMS) protocols (text messaging), which the user then enters into code entry box 180 illustrated in FIG. 20 to access the group sound pattern database. Any user identification for any operation described herein (including the group function of FIGS. 15 and 20) may include, alone or in combination with other types of identification such as username and password, facial recognition of the user, retinal recognition of the user, and/or fingerprint recognition of the user. In any embodiment using such recognition, no security code may be needed.

Once inside the group's sound pattern identification database, the sound patterns that may be played at earpiece or headphones 50 are limited to the sound patterns maintained in the group's sound pattern database. In an alternative embodiment the sound patterns maintained in the group's sound pattern database are available in addition to some other selected database, for example, a database related to that of the group, e.g., birdcalls. Group sound patterns may be stored in the category and subcategory, etc., manner discussed above. As before, display screen 24 may also display the "identify sounds" option 162 next to a swipe on/off icon 164. Here again, if the user swipes the "identify sounds" option 162 to "on", system 100 causes display screen 24 to identify and list the sound patterns as they are played at earpiece or headphones 50. The user may deactivate and reactivate displayed sound patterns as desired using on/off icon 164.

It is contemplated that the group databases may be used in many different types of applications. Military groups may store enemy fire sound pattern identifications, or other proprietary sound pattern identifications that are not appropriate for the public domain. A group of doctors may store abnormal heartbeat sound identifications to help with diagnosis. Similarly, doctors may store snore pattern file identifications that help to determine the source of a patient's snoring to aid diagnosis. Proprietary sound pattern identification group databases may also be formed for automotive and aircraft engine failure to help detect an improperly functioning engine.

Group sound pattern identification is one example of how sound pattern identification may be formed without having to use the resources of the administrators of system 100. Another example is the building of databases stored at memory device 32 of smart device 20 and/or at a user-dedicated area of memory 154 of server 150 that are proprietary to the user. The example mentioned above involves a teenager building a database identifying sound patterns useful for the teenager, e.g., the identification of the teenager's parents, siblings, friends, teachers, etc. Because those sound patterns are stored on the user's dedicated memory, they do not need to be password protected.

It is contemplated for system 100 that when microphone 34 detects a sound pattern, that the system potentially interrogates two databases, one a local database stored at memory device 32 of smart device 20 or at a user-dedicated area of memory 154 of server 150, and a second database, which is a general database and may be stored at server memory 154, and which is shared by all users of system 100.

Another example of how sound pattern identification may be formed without having to use the resources of the administrators of system 100 involves the shared database. Here, system 100 employs artificial intelligence ("AI") to create new sound pattern identifications. In one example, when system 100 analyzes a sound pattern and cannot find a matching identity, system 100 using its AI software in one embodiment finds the closest matching sound pattern and places the new sound pattern in the same area of the shared database as the closest matching sound pattern. For example, if an unidentifiable birdcall is detected, it is placed in the under "all birds" and in the same subcategory file as the closest matching identified birdcall. System 100 then provides a "help identify sounds" option for any user of system 100 who wishes to help with identifying currently unknown sound patterns. The "help identify sounds" option 182 may be provided at display screen 24 of smart device 20 as illustrated in FIG. 15 (before the user selects a subcategory and/or at FIG. 17 (182 not illustrated) after the user has selected a category) and/or may be provided at the website for system 100.

When the "help identify sounds" option 182 is selected by the user (e.g., at FIG. 15 or 17), a screen appears as illustrated in FIG. 21, which in the present example is on display screen 24 of smart device 20 (but could alternatively be on the website for system 100). FIG. 21 illustrates a swipeable wheel 184, which shows all categories that currently contain unidentified sound patterns. Selection box 186 highlights one of the categories. When a user sees a category appear in selection box 186 for which the user believes he or she is qualified to identify sound patterns, here "all birds", the user can select the highlighted category, e.g., by touching the selection box 186.

Figure 22:
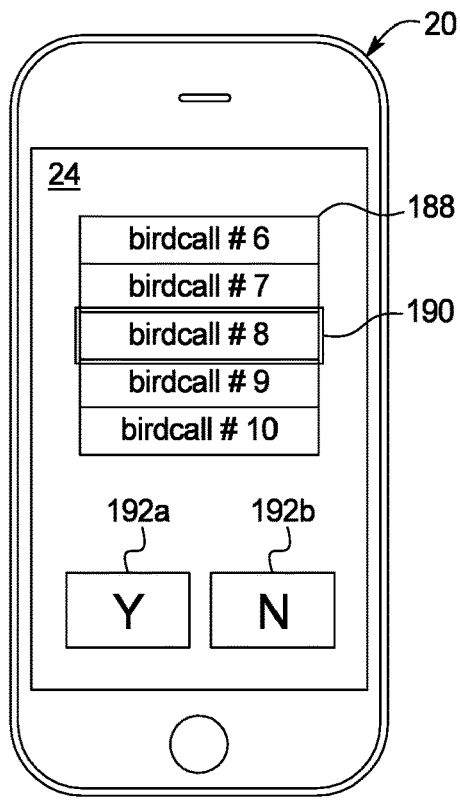
FIG. 22 is an elevation view of a screen of a user's smart device illustrating one embodiment for enabling a user to select a particular sound pattern from a selected category of unidentified sound patterns for which the user intends to provide identification and subclassification.

FIG. 22 illustrates that once the user selects a category of sound patterns to identify, display screen 24 of smart device 20 (but could alternatively be on the website for system 100) presents a swipeable wheel 188, which shows all unidentified sound patterns within the selected category. Selection box 190 highlights one of the unidentified sound patterns. The user may select to listen to any unidentified sound pattern by pressing selection box 190 highlighting that sound, which system 100 then causes to be played at users earpiece or headphones 50 (user may listen multiple times). FIG. 22 also provides "identify sound Y or N" selection boxes 192a and 192b, respectively, which are highlighted for selection whenever an unidentified sound pattern is played. The highlighting for selection may last for a timeout period, such as ten seconds, and/or the user may be required to select yes or no before selecting a new sound for potential identification.

Figure 23:
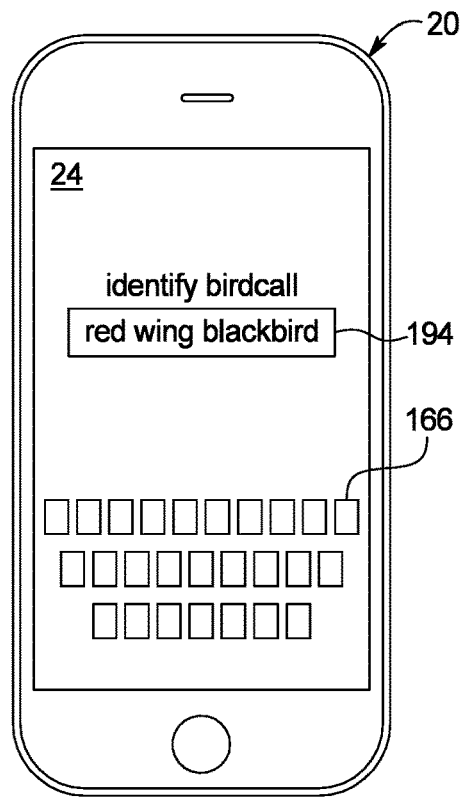
FIG. 23 is an elevation view of a screen of a user's smart device illustrating one embodiment for enabling a user to enter an identity for an unidentified sound pattern.

If the user selects the yes or "Y" selection box 192a, system 100 provides FIG. 23 at display screen 24 of smart device 20 (but could alternatively be on the website for system 100), which calls forth keyboard 166 for the user to enter an identification name for the unidentified sound into identification box 194. In the illustrated example, the user enters the name "red wing blackbird" in response to listening to the unidentified sound and selecting the "Y" selection box 192a.

Figure 24:
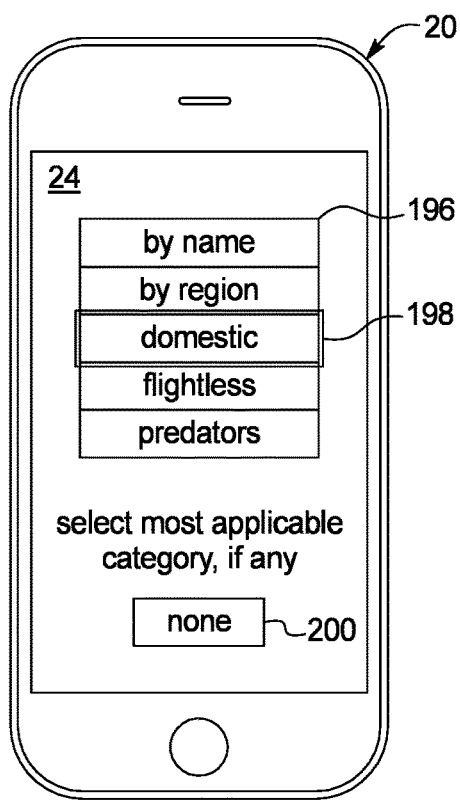
FIG. 24 is an elevation view of a screen of a user's smart device illustrating one embodiment for enabling a user to enter a subcategory for an unidentified sound pattern.

System 100 displays FIG. 24 to the user after the user enters an identification for a previously unidentified sound in FIG. 23. Here, display screen 24 of smart device 20 (but could alternatively be on the website for system 100) presents a swipeable wheel 196, which shows all current subcategories under the currently selected category. Selection box 198 highlights one of the subcategories. FIG. 24 also provides an audio, visual or audiovisual prompt for the user to "select the most applicable subcategory for your identification, if any". The user may scroll through the subcategories and select the most appropriate by touching selection box 198 when the box highlights the category. FIG. 24 also provides a "none" option selection box 200, which the user may press if the user does not think any subcategory is appropriate, wherein the identified sound will be stored directly under the overall category.

After the two-step identification of the previously unidentified sound and subcategory placement in FIGS. 23 and 24, system 100 may provide an audio, visual or audiovisual message thanking the user and stating that their sound pattern identification and subcategory selection are being processed. It is contemplated for system 100 to attempt to verify the sound pattern identification and subcategory selection in one or more way. First, the AI software of system 100 may be programmed to look for the identification on the internet. In the above example, system 100 would look for "red wing blackbird" on the internet. If the identification cannot be found verbatim on an internet website, then the identification is removed and the sound pattern is returned to being unknown. Alternatively or additionally, when a sound pattern is initially identified and placed in a subcategory, the sound pattern and associated identification are placed in a temporary "verification" location of server memory 154. FIG. 14 in addition to providing a "help identify sounds" option 182 also provides a "verify identified sounds" option 202 in which users are invited to verify sound patterns and associated categories previously identified. Here, the user proceeds through screens like in FIGS. 21 and 22 in which the user selects a category and an identified sound pattern to verify.

Figure 25:
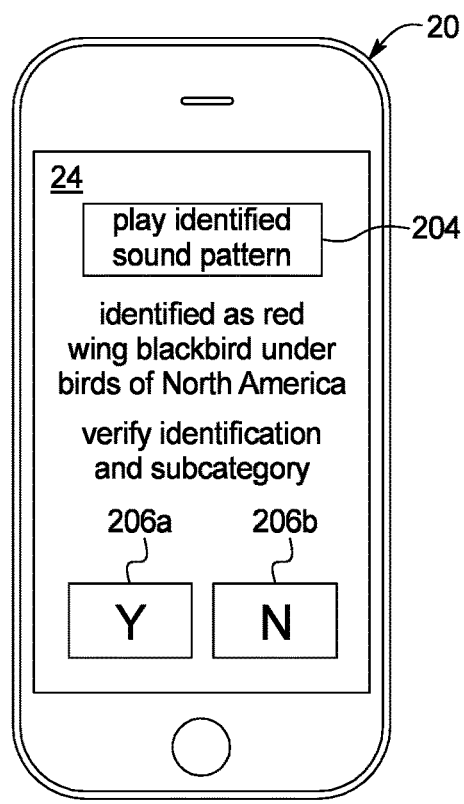
FIG. 25 is an elevation view of a screen of a user's smart device illustrating one embodiment for enabling a user to verify identification and subclassification for a newly identified sound pattern provided by a different user.

Once the user selects a sound pattern identity to verify, system 100 causes display screen 24 of smart device 20 (but could alternatively be on the website for system 100) to show the screen of FIG. 25, which provides a "play identified sound pattern" button 204, which the user presses to hear the unidentified sound pattern at earpiece or headphones 50 (which may be performed multiple times as desired). When the sound pattern is first played, a message is displayed at display screen 24 showing the previous identification, e.g., "identified as red wing blackbird and subcategorized under 'birds of North America'". FIG. 25 as illustrated also provides "verify identified sound and subcategory Y or N" selection boxes 206a and 206b. If the user selects the yes "Y" box 206a, then the identification and classification are confirmed. System 100 may require verification one or more times before releasing the sound pattern from the temporary "verification" location of server memory 154.

If the user instead selects the no "N" box 206b, e.g., the user disagrees with either or both the identification and/or subclassification, the user is allowed to enter his or her own identification and subclassification, if any. System 100 then maintains the sound pattern in the temporary "verification" location of server memory 154, but shows the two or more competing identifications and subclassifications, so that the next user can see each of the previous attempts. In an embodiment, system 100 attaches to each identification attempt a smart device identifier to prevent the same user from attempting to verify the user's own identification and subclassification.

In an alternative verification embodiment, system 100 does not provide a "verify identified sounds" option 202 in FIG. 14 but instead maintains a sound pattern as unidentified until a predetermined number of different users provides the same identification and subclassification for the unidentified sound pattern. Afterwards, system 100 deems the sound pattern to be identified and places the sound pattern in the named subclassification.

Systems 10 and 100 may be implemented alternatively or additionally using a voice activated virtual assistant 44. In system FIGS. 1 and 14, voice activated virtual assistant 44 is illustrated as interfacing between microphone 34 and processor 30 and memory 32. In an alternative embodiment, virtual assistant 44 is a smart device separate from the user's smart phone, which provides its own microphone, processor and memory. The remote virtual assistant 44 may also operate its own speaker. In any variation, virtual assistant 44 may (i) completely eliminate the display of any system information on display screen 24, (ii) serve as the user's input or selection mechanism, while the user's choices and options are displayed on display screen 24, and/or (iii) serve as one user input or selection mechanism, while the touch screen operating display screen 24 serves as a second input or selection mechanism. In (ii) and (iii) each of the screens of FIGS. 5 to 7, 10, 12, 13, 15 to 18, and 20 to 25 may still be displayed, but may instead be navigated using voice command. In various examples, the user may specify, for example, "Assistant, put me in sleep mode", or "Assistant, put me in nap mode", or "Assistant, only play red wing blackbird calls", in one embodiment after pressing input device 26. Where a user command leads to a list of subcategories, virtual assistant 44 may cause earpiece or headphones 50 query whether to play all sound patterns of a category or to list possibilities, e.g., "Would you like to hear all birdcalls or should I list options?". Where a user has to make a choice, virtual assistant 44 may cause earpiece or headphones 50 to automatically query the options, e.g., "Do want plane, train or bus nap mode?". The user may then answer via voice command or input via the touch screen operating display screen 24.

It should be understood that other changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims. For example, while the display screen of system 10 illustrates sound pattern icons that may be toggled to activate or deactivate the sound, other ways of enabling the user to activate or deactivate the sound may be provided. For example, a two-step procedure of highlighting an icon and then selecting "activate" or "deactivate" may be implemented instead. And as discussed above, while system 10 is described primarily for use with hearing impairment, system 10 is also readily applicable to any situation in which a user desires to selectively hear certain sound patterns and to not hear others. Also, while the present disclosure describes the playing of sound patterns at the user's earpiece, it is also contemplated to play sound patterns to the users at the speakers of their smart devices.

The invention is claimed as follows:

1. A hearing improvement system for use with a smart device and earpiece/headphones of a user, the system comprising:
    software stored on or accessed by a memory device of the smart device, the software configured to be executed by a processor of the smart device to
        cause an audio signal received from a microphone of or operating with the smart device if containing two or more sound patterns to be separated into a plurality of individualized sound patterns;
        categorize the individualized sound patterns;
        display an icon representing each categorized sound pattern on a screen of the smart device;
        enable the user viewing the icons to at least one of deactivate or activate each of the individualized sound patterns;
        cause each of the individualized sound patterns that were not deactivated by the user to be delivered to the earpiece/headphones; and
        delete one of the displayed icons for the corresponding individualized sound pattern when its associated audio signal is not detected by the microphone for a period of time.

2. The hearing improvement system of claim 1, which is configured to initially activate each of the individualized sound patterns and to enable the user to deactivate any of the activated sound patterns.

3. The hearing improvement system of claim 1, which is configured to initially not activate any of the individualized sound patterns and to enable the user to activate any of the non-activated sound patterns.

4. The hearing improvement system of claim 1, which is configured to separate the audio signal into at least two sound patterns by analyzing at least one of: (i) an average frequency and/or range of frequencies difference between the at least two sound patterns, (ii) an average amplitude and/or range of amplitudes difference between the at least two sound patterns, or (iii) a reflection or accent theme difference between the at least two sound patterns.

5. The hearing improvement system of claim 4, which is configured to separate the audio signal into at least two sound patterns by (a) analyzing one of (i), (ii) or (iii), (b) if unable to discern between any two sound patterns, then analyzing another one of (i), (ii) or (iii), and (c) if unable to discern between any two sound patterns, then analyzing a third one of (i), (ii) or (iii).

6. The hearing improvement system of claim 1, which is configured such that at least one of (i) a sound pattern deactivated by the user may be reactivated, or (ii) a sound pattern activated by the user may be re-deactivated.

7. The hearing improvement system of claim 1, which includes at least one selectable profile displayed on the screen of the smart device, the profile when selected automatically deactivating predetermined ones of the sound patterns.

8. The hearing improvement system of claim 7, wherein the at least one selectable profile is a sleep profile, a music only profile, or a driving profile.

9. The hearing improvement system of claim 1, which is configured to provide a reset feature, which enables the user to delete all existing sound patterns.

10. The hearing improvement system of claim 1, wherein the audio signal or the individualized sound patterns are digitized for operation with the processor.

11. A hearing improvement system for use with a smart device and earpiece/headphones of a user, the system comprising:
    software stored on or accessed by a memory device of the smart device, the software configured to be executed by a processor of the smart device to
        cause an audio signal received from a microphone of or operating with the smart device if containing two or more sound patterns to be separated into a plurality of individualized sound patterns;
        categorize the individualized sound patterns;
        display an icon representing each categorized sound pattern on a screen of the smart device;
        enable the user viewing the icons to adjust a volume level for each of the individualized sound patterns;
        cause the volume adjusted sound patterns to be delivered to the earpiece/headphones; and
        delete one of the displayed icons for the corresponding individualized sound pattern when its associated audio signal is not detected by the microphone for a period of time.

12. The hearing improvement system of claim 11, which is configured to separate the audio signal into at least two sound patterns by analyzing at least one of: (i) an average frequency and/or range of frequencies difference between the at least two sound patterns, (ii) an average amplitude and/or range of amplitudes difference between the at least two sound patterns, (iii) a reflection or accent theme difference between the at least two sound patterns.

13. The hearing improvement system of claim 11, which includes at least one volume adjuster displayed on the screen of the smart device to adjust the volume level for each of the sound patterns.

14. The hearing improvement system of claim 13, wherein the at least one volume adjuster includes a separate adjuster associated with each displayed icon.

15. The hearing improvement system of claim 11, wherein the volume level for each sound pattern is adjusted as a percentage of a maximum volume.

16. A hearing improvement system for use with a smart device and earpiece/headphones of a user, the system comprising:
    a plurality of icons displayed on a screen of the smart device, each icon corresponding to a sound pattern obtained from an audio signal received via a microphone of or operating with the smart device, each displayed icon selectable to at least one of deactivate or activate the associated sound pattern, wherein the associated sound patterns are formed by at least one of (i) analyzing differences between average frequencies and/or ranges of frequencies of the associated sound patterns, (ii) analyzing differences between average amplitudes and/or ranges of amplitudes of the associated sound patterns, or (iii) analyzing differences between reflections or accent themes of the associated sound patterns, and wherein one of the displayed icons for the corresponding sound pattern is removed from selection when its associated audio signal is not detected by the microphone for a period of time.

17. The hearing improvement system of claim 16, which is configured to enable a user to select between at least two operational modes.

18. The hearing improvement system of claim 17, wherein the at least two operational modes include (i) a default activate mode, (ii) a default non-activate mode, or (iii) a volume adjust mode.

19. The hearing improvement system of claim 16, which is configured to gray-out or otherwise designate each deactivated or non-activated icon so that the icon is identifiable for later activation.

20. The hearing improvement system of claim 16, wherein the associated sound patterns are formed by (a) analyzing one of (i), (ii) or (iii), (b) if unable to discern between any two sound patterns, then analyzing another one of (i), (ii) or (iii), and (c) if unable to discern between any two sound patterns, then analyzing a third one of (i), (ii) or (iii).

21. A hearing improvement system for use with a smart device and earpiece/headphones of a user, the system comprising:

software stored on or accessed by a memory device of the smart device, the software configured to be executed by a processor of the smart device to enable the user to preselect at least one sound pattern from a plurality of sound patterns or at least one sound pattern category from a plurality of sound pattern categories;

analyze an audio signal received from a microphone of or operating with the smart device to determine if the audio signal includes the at least one preselected sound pattern or at least one sound pattern from the at least one preselected sound pattern category;

cause each of the received at least one preselected sound pattern or at least one sound pattern from the at least one preselected sound pattern category to be delivered to the earpiece/headphones; and delete one of the sound patterns when its associated audio signal is not detected by the microphone for a period of time.

22. The hearing improvement system of claim 21, wherein the smart device is configured to display a selector enabling the user to preselect the at least one sound pattern from a plurality of sound patterns or the at least one sound pattern category from the plurality of sound pattern categories.

23. The hearing improvement system of claim 21, wherein the smart device is configured to display a drop down menu enabling the user to preselect the at least one sound pattern from a plurality of sound patterns or the at least one sound pattern category from the plurality of sound pattern categories.

24. The hearing improvement system of claim 21, wherein the smart device is configured to display a keypad enabling the user to preselect the at least one sound pattern from the plurality of sound patterns or the at least one sound pattern category from a plurality of sound pattern categories.

* * * * *